US012658594B2

(12) United States Patent
Lin et al.

(10) Patent No.: US 12,658,594 B2
(45) Date of Patent: Jun. 16, 2026

(54) SYSTEM HAVING RECONFIGURABLE REFLECTARRAY STRUCTURE

(71) Applicant: NATIONAL CHUNG CHENG UNIVERSITY, Chiayi (TW)

(72) Inventors: Shih-Cheng Lin, Taitung County (TW); Sheng-Fuh Chang, Chiayi County (TW); Chia-Chan Chang, Chiayi City (TW); Yuan-Chun Lin, Hsinchu County (TW); Ting-Hao Shin, Tainan City (TW)

(73) Assignee: NATIONAL CHUNG CHENG UNIVERSITY, Chiayi (TW)

( * ) Notice: Subject to any disclaimer, the term of this patent is extended or adjusted under 35 U.S.C. 154(b) by 87 days.

(21) Appl. No.: 18/761,344

(22) Filed: Jul. 2, 2024

(65) Prior Publication Data

US 2025/0149798 A1 May 8, 2025

(30) Foreign Application Priority Data

Nov. 8, 2023 (TW) ................................ 112142962

(51) Int. Cl.
*H01Q 3/46* (2006.01)
*H01Q 15/00* (2006.01)

(52) U.S. Cl.
CPC ................................ *H01Q 15/002* (2013.01)

(58) Field of Classification Search
CPC ....... H01Q 3/46; H01Q 15/002; H01Q 15/148
See application file for complete search history.

(56) References Cited

U.S. PATENT DOCUMENTS 6,366,254 B1 * 4/2002 Sievenpiper ........... H01Q 21/20 343/770
8,339,328 B2 12/2012 Narasimhan et al.
10,978,810 B2 * 4/2021 Lee ....................... G01S 13/753
(Continued)

FOREIGN PATENT DOCUMENTS

TW 201810802 A 3/2018
TW 201935767 A 9/2019
TW 202203599 A 1/2022

OTHER PUBLICATIONS

Carrasco et al., "X-Band Reflectarray Antenna With Switching-BeamUsing PIN Diodes and Gathered Elements", IEEE Transactions on Antennas and Propagation, vol. 60, No. 12, Dec. 2012 (Year: 2012).*
(Continued)

*Primary Examiner* — Dimary S Lopez Cruz
*Assistant Examiner* — Marin Stoytchev Stoytchev
(74) *Attorney, Agent, or Firm* — CKC & Partners Co., LLC

(57) ABSTRACT

A system having a Reconfigurable ReflectArray (RRA) structure includes a radiation layer and a control layer. The radiation layer includes at least one P-Intrinsic-N (P-I-N) diode and a plurality of reconfigurable reflective units. At least one part of the reconfigurable reflective units is electrically connected to the at least one P-I-N diode. The control layer includes at least one switch element and at least one control unit. The at least one switch element is electrically connected to the radiation layer. The at least one control unit is electrically connected to the at least one switch element. The number of the reconfigurable reflective units is different from the number of the at least one switch element.

15 Claims, 17 Drawing Sheets

(56) References Cited

U.S. PATENT DOCUMENTS

| | | | | |
|---|---|---|---|---|
| 12,284,005 | B2 * | 4/2025 | Chang | H01Q 15/148 |
| 2025/0185055 | A1 * | 6/2025 | Elshafie | H04B 7/0617 |

OTHER PUBLICATIONS

Han et al., "A Wideband 1 bit 12 x 12 Reconfigurable Beam-Scanning Reflectarray: Design, Fabrication, and Measurement", IEEE Antennas and Wireless Propagation Letters, vol. 18, No. 6, Jun. 2019 (Year: 2019).*

Yichen Zhong et al., "A 1-bit, Low-Complexity, 20×20-Element Electronically Reconfigurable Reflectarray Antenna", 2019 13th European Conference on Antennas and Propagation, dated on Mar. 31-Apr. 5, 2019, pp. 1-3, Poland.

Huanhuan Yang et al., "A 1-Bit 10 × 10 Reconfigurable Reflectarray Antenna: Design, Optimization, and Experiment", IEEE Transactions on Antennas and Propagation, published on Apr. 7, 2016, vol. 64, issue 6, pp. 2246-2254, published by Institute of Electrical and Electronics Engineers, United States.

* cited by examiner

SYSTEM HAVING RECONFIGURABLE REFLECTARRAY STRUCTURE

RELATED APPLICATIONS

This application claims priority to Taiwan Application Serial Number 112142962, filed Nov. 8, 2023, which is herein incorporated by reference.

BACKGROUND

Technical Field

The present disclosure relates to a system having a reflectarray structure. More particularly, the present disclosure relates to a system having a reconfigurable reflectarray structure.

Description of Related Art

Since 2015, a Reconfigurable Intelligent Surface (RIS) technology has been widely discussed. Even in middle of 2023, the RIS technology has been incorporated into a key technology in the sixth generation (6G) mobile wireless communication networks by many enterprises, legal persons or international organizations. The RIS technology is expected to be capable of replacing part of the base station deployment or the active radio frequency device (e.g., the booster). However, it is currently known that the power consumption of the conventional RIS technology is too large, and the manufacturing cost and the subsequent maintenance cost are too high, so that it is not easy to be adopted by the public or telecom operators. Therefore, a system having a reconfigurable reflectarray structure which is capable of reducing the power consumption, the manufacturing cost and the subsequent maintenance cost is commercially desirable.

SUMMARY

According to one aspect of the present disclosure, a system having a Reconfigurable ReflectArray (RRA) structure includes a radiation layer and a control layer. The radiation layer includes at least one P-Intrinsic-N (P-I-N) diode and a plurality of reconfigurable reflective units. At least one part of the reconfigurable reflective units is electrically connected to the at least one P-I-N diode. The control layer includes at least one switch element and at least one control unit. The at least one switch element is electrically connected to the radiation layer. The at least one control unit is electrically connected to the at least one switch element. A number of the reconfigurable reflective units is different from a number of the at least one switch element.

According to another aspect of the present disclosure, a system having a Reconfigurable ReflectArray (RRA) structure includes a radiation layer and a control layer. The radiation layer includes at least one first P-Intrinsic-N (P-I-N) diode, at least one second P-I-N diode, a plurality of first reconfigurable reflective units and a plurality of second reconfigurable reflective units. At least one part of the first reconfigurable reflective units is electrically connected to the at least one first P-I-N diode. One part of the second reconfigurable reflective units is electrically connected to the at least one second P-I-N diode, and another part of the second reconfigurable reflective units is floating. The control layer includes at least one first switch element, at least one second switch element, at least one first control unit and at least one second control unit. The at least one first switch element is electrically connected to the radiation layer. The at least one second switch element is electrically connected to the radiation layer. The at least one first control unit is electrically connected to the at least one first switch element. The at least one second control unit is electrically connected to the at least one second switch element. A number of the first reconfigurable reflective units is different from a number of the at least one first switch element, and a number of the second reconfigurable reflective units is different from a number of the at least one second switch element.

According to further another aspect of the present disclosure, a system having a Reconfigurable ReflectArray (RRA) structure includes a radiation layer and a control layer. The radiation layer includes at least one first P-Intrinsic-N (P-I-N) diode, a plurality of second P-I-N diodes, a plurality of first reconfigurable reflective units and a plurality of second reconfigurable reflective units. At least one part of the first reconfigurable reflective units is electrically connected to the at least one first P-I-N diode. The second reconfigurable reflective units are electrically connected to the second P-I-N diodes, respectively. The control layer includes at least one first switch element, at least one second switch element, at least one first control unit and at least one second control unit. The at least one first switch element is electrically connected to the radiation layer. The at least one second switch element is electrically connected to the radiation layer. The at least one first control unit is electrically connected to the at least one first switch element. The at least one second control unit is electrically connected to the at least one second switch element. A number of the first reconfigurable reflective units is different from a number of the at least one first switch element, and a number of the second reconfigurable reflective units is different from a number of the at least one second switch element.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
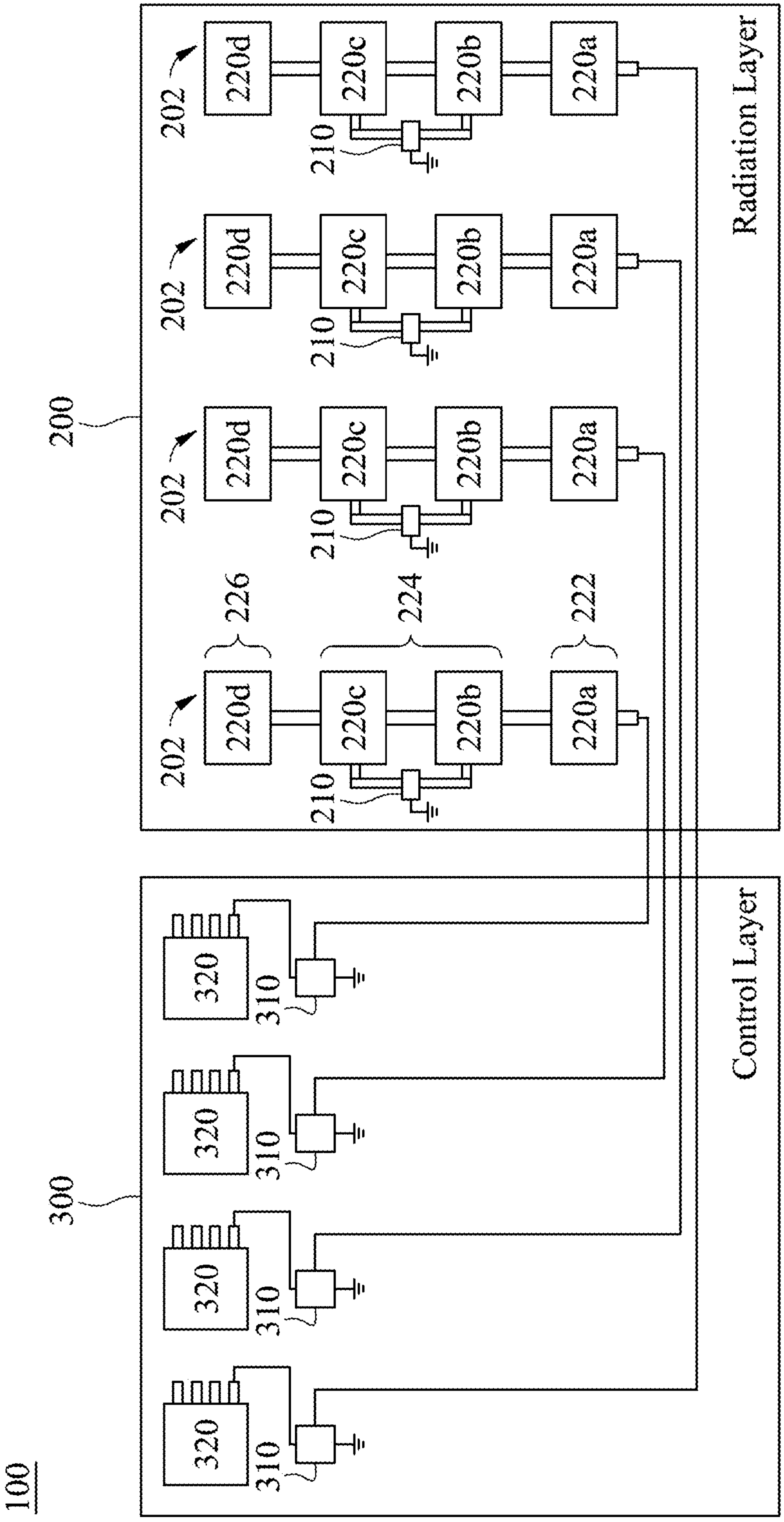
FIG. 1 shows a schematic view of a system having a Reconfigurable ReflectArray (RRA) structure according to a first embodiment of the present disclosure.

Reference is made to FIG. 1. FIG. 1 shows a schematic view of a system 100 having a Reconfigurable ReflectArray (RRA) structure according to a first embodiment of the present disclosure. The system 100 having the RRA structure includes a radiation layer 200 and a control layer 300. The radiation layer 200 includes four radiation modules 202, and each of the four radiation modules 202 includes a P-Intrinsic-N (P-I-N) diode 210 and a plurality of reconfigurable reflective units 220*a*, 220*b*, 220*c*, 220*d* (220*a*-220*d*). At least one part of the reconfigurable reflective units 220*a*-220*d* is electrically connected to the P-I-N diode 210. The control layer 300 includes at least one switch element 310 and at least one control unit 320. The at least one switch element 310 is electrically connected to the radiation layer 200. The at least one control unit 320 is electrically connected to the at least one switch element 310. The number of the reconfigurable reflective units 220*a*-220*d* is different from the number of the at least one switch element 310.

In detail, the reconfigurable reflective units 220*a*-220*d* share the P-I-N diode 210. The number of the reconfigurable reflective units 220*a*-220*d* is different from the number of the P-I-N diode 210. For example, in the radiation module 202, the reconfigurable reflective units 220*a*-220*d* are arranged into a 4×1 one-dimensional array. The number of the reconfigurable reflective units 220*a*-220*d* is 4, and the number of the P-I-N diode 210 is 1. The number of the at least one switch element 310 corresponding to the one radiation module 202 is 1, and the number of the at least one control unit 320 corresponding to the one radiation module 202 is 1. In other words, the number of the reconfigurable reflective units 220*a*-220*d* is greater than the number of the P-I-N diode 210. The number of the reconfigurable reflective units 220*a*-220*d* is greater than the number of the switch element 310. The number of the P-I-N diode 210, the number of the switch element 310 and the number of the control unit 320 are the same.

The reconfigurable reflective units 220*a*-220*d* include a first radiating portion 222, a second radiating portion 224 and a third radiating portion 226. The first radiating portion 222 includes the reconfigurable reflective unit 220*a* and is connected to the switch element 310. The second radiating portion 224 includes the reconfigurable reflective units 220*b*, 220*c* and is connected between the first radiating portion 222 and the P-I-N diode 210. The third radiating portion 226 includes the reconfigurable reflective unit 220*d* and is connected to the second radiating portion 224. The reconfigurable reflective units 220*a*-220*d* can be connected in sequence by a plurality of first metal connecting portion having a strip shape. The styles of the reconfigurable reflective units 220*a*-220*d* can be the same or different based on the application requirements. The reconfigurable reflective units 220*b*, 220*c* can be respectively connected to the P-I-N diode 210 by two second metal connecting portions having an L shape.

In the embodiment, all of the reconfigurable reflective units 220*a*-220*d* in the radiation layer 200 are arranged into a 4×4 two-dimensional array. The number of all of the P-I-N diodes 210 in the radiation layer 200 is 4. The number of all of the switch elements 310 in the control layer 300 is 4, and the number of all of the control units 320 in the control layer 300 is 4, but the present disclosure is not limited thereto. In addition, the control units 320 of the control layer 300 generate control signals. The switch elements 310 receive the control signals and control the reconfigurable reflective units 220*a*-220*d* according to the control signals.

Figure 2:
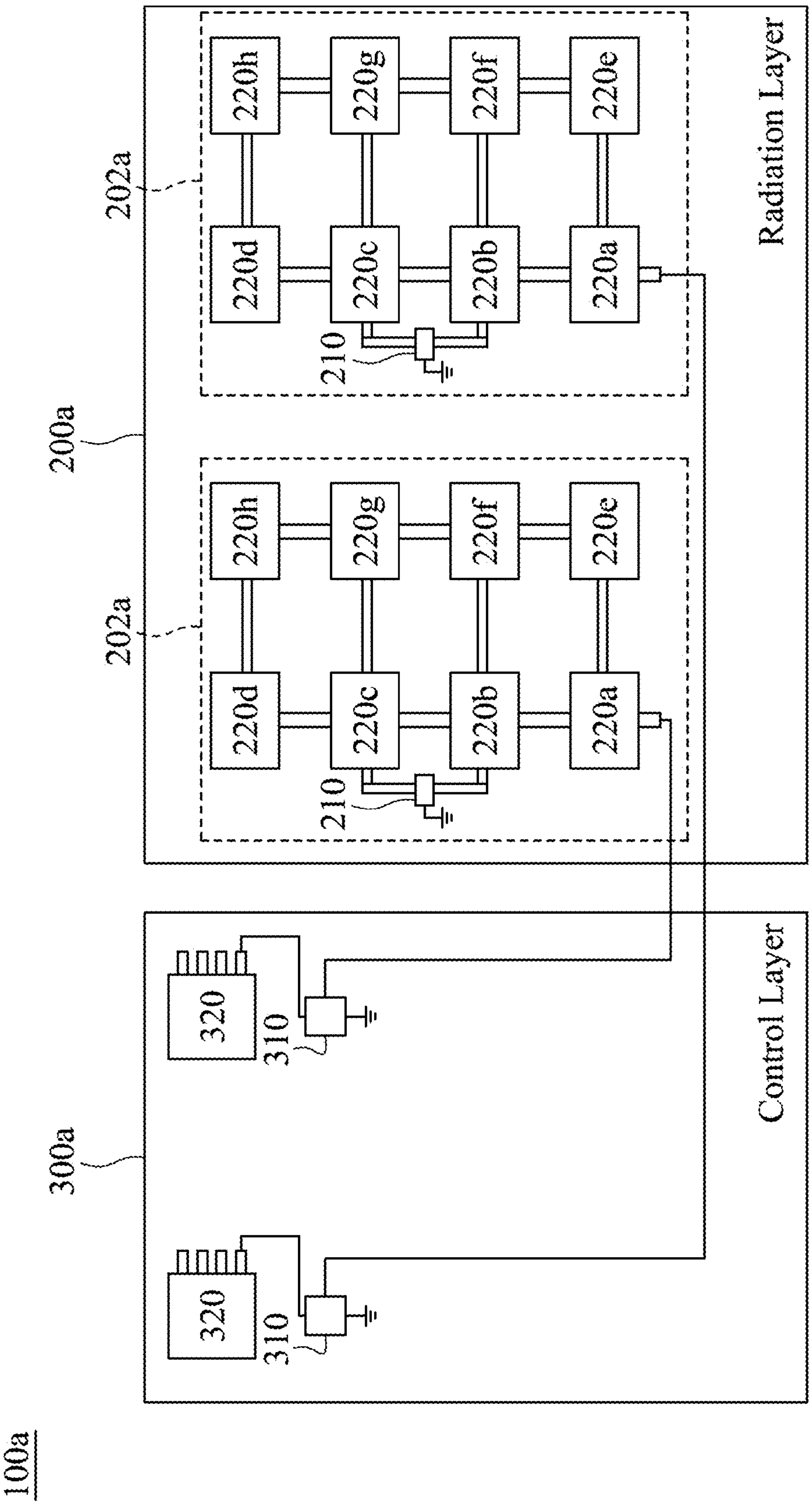
FIG. 2 shows a schematic view of a system having a RRA structure according to a second embodiment of the present disclosure.

Reference is made to FIGS. 1 and 2. FIG. 2 shows a schematic view of a system 100*a* having a RRA structure according to a second embodiment of the present disclosure. The system 100*a* having the RRA structure includes a radiation layer 200*a* and a control layer 300*a*. The radiation layer 200*a* includes two radiation modules 202*a*, and each of the two radiation modules 202*a* includes a P-I-N diode 210 and a plurality of reconfigurable reflective units 220*a*, 220*b*, 220*c*, 220*d*, 220*e*, 220*f*, 220*g*, 220*h* (220*a*-220*h*). At least one part of the reconfigurable reflective units 220*a*-220*h* is electrically connected to the P-I-N diode 210. The control layer 300*a* includes two switch elements 310 and two control units 320. The two switch elements 310 are electrically connected to the radiation layer 200*a*. The two control units 320 are electrically connected to the two switch elements 310. The number (e.g., 8) of the reconfigurable reflective units 220*a*-220*h* is different from the number (e.g., 1) of the switch element 310 (corresponding to each of the two radiation modules 202*a*).

The structures of the P-I-N diode 210, the reconfigurable reflective units 220*a*-220*d*, the switch element 310 and the control unit 320 in FIG. 2 are the same as the structures of the P-I-N diode 210, the reconfigurable reflective units 220*a*-220*d*, the switch element 310 and the control unit 320 in FIG. 1, and will not be described again herein. The reconfigurable reflective unit 220*e* is connected to the reconfigurable reflective unit 220*a*. The reconfigurable reflective unit 220*f* is connected to the reconfigurable reflective units 220*b*, 220*e*. The reconfigurable reflective unit 220*g* is connected to the reconfigurable reflective units 220*c*, 220*f*. The reconfigurable reflective unit 220*h* is connected to the reconfigurable reflective units 220*d*, 220*g*.

In each of the two radiation modules 202*a*, the reconfigurable reflective units 220*a*-220*h* are arranged into a 4×2 two-dimensional array. In the embodiment, all of the reconfigurable reflective units 220*a*-220*h* in the radiation layer 200*a* are arranged into a 4×4 two-dimensional array. The number of all of the P-I-N diodes 210 in the radiation layer 200*a* is 2. The number of all of the switch elements 310 in the control layer 300*a* is 2, and the number of all of the control units 320 in the control layer 300*a* is 2, but the present disclosure is not limited thereto.

Figure 3:
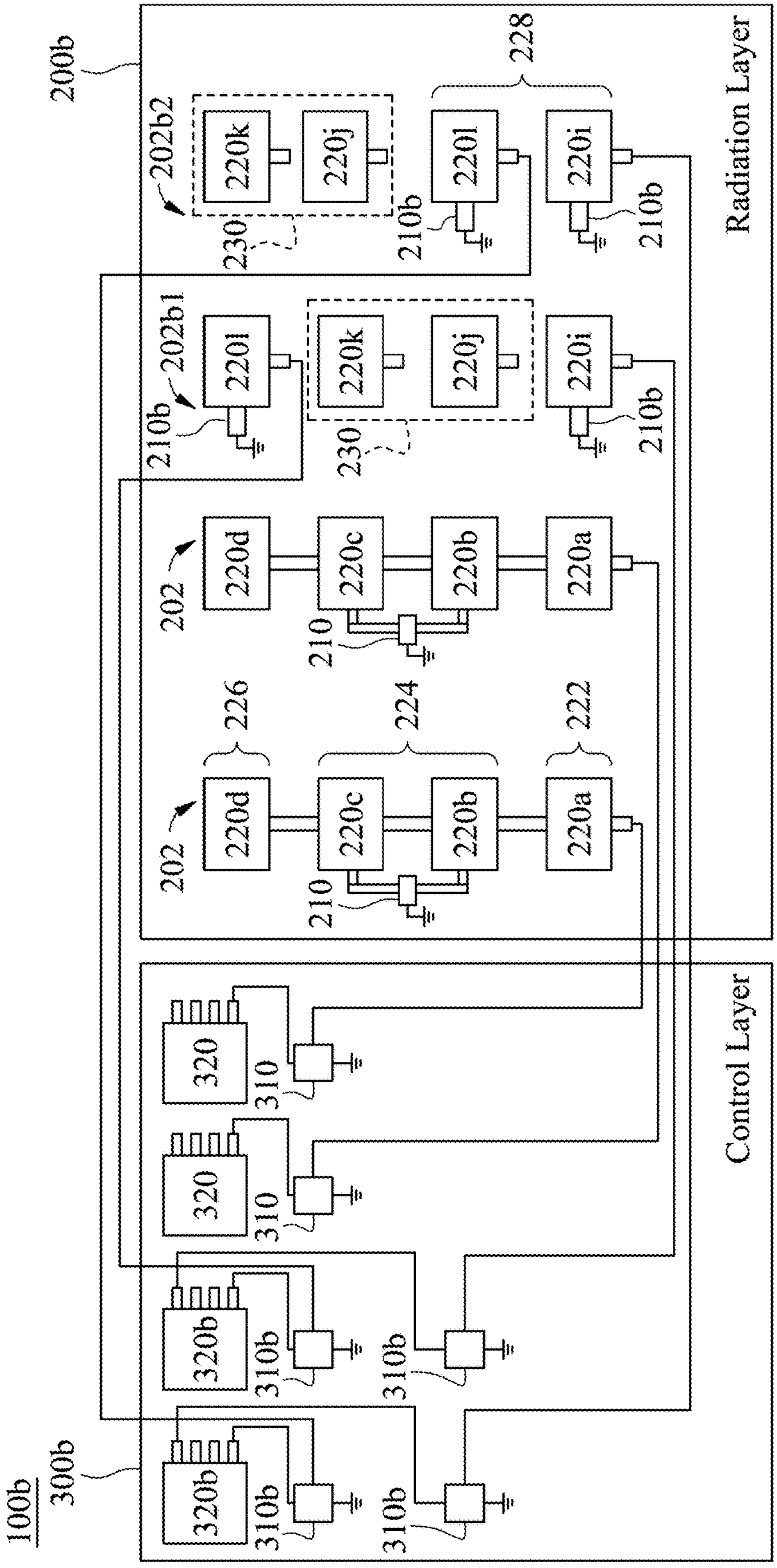
FIG. 3 shows a schematic view of a system having a RRA structure according to a third embodiment of the present disclosure.

Reference is made to FIGS. 1 and 3. FIG. 3 shows a schematic view of a system 100*b* having a RRA structure according to a third embodiment of the present disclosure. The system 100*b* having the RRA structure includes a radiation layer 200*b* and a control layer 300*b*. The radiation layer 200*b* includes two first radiation modules (i.e., the radiation modules 202) and two second radiation modules 202*b*1, 202*b*2. Each of the two first radiation modules (i.e., the radiation modules 202) includes a first P-I-N diode (i.e., the P-I-N diode 210) and a plurality of first reconfigurable reflective units (i.e., the reconfigurable reflective units 220*a*-220*d*). The structure of each of the two first radiation modules is the same as the structure of each of the radiation modules 202 in FIG. 1, and will not be described again herein. Each of the two second radiation modules 202*b*1, 202*b*2 includes two second P-I-N diodes 210*b* and four second reconfigurable reflective units 220*i*, 220*j*, 220*k*, 220*l* (220*i*-220*l*). One part (e.g., the second reconfigurable reflective units 220*i*, 220*l*) of the four second reconfigurable reflective units 220*i*-220*l* is electrically connected to the two second P-I-N diodes 210*b*, and another part (e.g., the second reconfigurable reflective units 220*j*, 220*k*) of the four second reconfigurable reflective units 220*i*-220*l* is floating. In addition, the control layer 300*b* includes two first switch elements (i.e., the switch elements 310), four second switch elements 310*b*, two first control units (i.e., the control units 320) and two second control units 320*b*. The two first switch elements (i.e., the switch elements 310) are electrically connected to the radiation layer 200*b*. The four second switch elements 310*b* are electrically connected to the radiation layer 200*b*. The two first control units (i.e., the control units 320) are electrically connected to the two first switch elements (i.e., the switch elements 310). The two second control units 320*b* are electrically connected to the four second switch elements 310*b*.

The number of the first reconfigurable reflective units (i.e., the reconfigurable reflective units 220*a*-220*d*) is different from the number of the first switch element (i.e., the switch element 310). The number of the second reconfigurable reflective units 220*i*-220*l* is different from the number of the second switch elements 310*b*. The number of the second reconfigurable reflective units 220*i*-220*l* is different from the number of the second P-I-N diodes 210*b*. For example, in the second radiation module 202*b*1, the second reconfigurable reflective units 220*i*-220*l* are arranged into a 4×1 one-dimensional array. The number of the second reconfigurable reflective units 220*i*-220*l* is 4, and the number of the second P-I-N diodes 210*b* is 2. The number of the second switch elements 310*b* corresponding to the second radiation module 202*b*1 is 2, and the number of the second control unit 320*b* corresponding to the second radiation module 202*b*1 is 1. In other words, the number of the second reconfigurable reflective units 220*i*-220*l* is greater than the number of the second P-I-N diodes 210*b*. The number of the second reconfigurable reflective units 220*i*-220*l* is greater than the number of the second switch elements 310*b*. The number of the second P-I-N diodes 210*b* and the number of the second switch elements 310*b* are the same.

The first reconfigurable reflective units (i.e., the reconfigurable reflective units 220*a*-220*d*) include a first radiating portion 222, a second radiating portion 224 and a third radiating portion 226. The first radiating portion 222 is connected to the first switch element (i.e., the switch element 310). The second radiating portion 224 is connected between the first radiating portion 222 and the first P-I-N diode (i.e., the P-I-N diode 210). The third radiating portion 226 is connected to the second radiating portion 224. Furthermore, the second reconfigurable reflective units 220*i*-220*l* include a fourth radiating portion 228 and a fifth radiating portion 230. The fourth radiating portion 228 is connected to the second switch elements 310*b*. Specifically, the fourth radiating portion 228 includes the second reconfigurable reflective units 220*i*, 220*l*. The second reconfigurable reflective unit 220*i* is connected to one of the second switch elements 310*b*. The second reconfigurable reflective unit 220*l* is connected to another of the second switch elements 310*b*. The fifth radiating portion 230 corresponds to the another part of the second reconfigurable reflective units 220*i*-220*l*. The fifth radiating portion 230 includes the second reconfigurable reflective units 220*j*, 220*k*, and the second reconfigurable reflective units 220*j*, 220*k* are adjacent to each other.

The two first control units (i.e., the control units 320) generate two first control signals. The two first switch elements (i.e., the switch elements 310) receive the two first control signals and control the first reconfigurable reflective units (i.e., the reconfigurable reflective units 220*a*-220*d*) according to the two first control signals. The two second control units 320*b* generate four second control signals. The four second switch elements 310*b* receive the four second control signals and control the second reconfigurable reflective units 220*i*, 220*l* of the fourth radiating portion 228 according to the four second control signals.

It is also worth mentioning that the difference between the two second radiation modules 202*b*1, 202*b*2 is that the second reconfigurable reflective units 220*j*, 220*k* of the fifth radiating portion 230 are located in different positions. The two second radiation modules 202*b*1, 202*b*2 have different reflection phases. Therefore, the present disclosure can adaptively adjust the reflection phases of the radiation layer 200*b*.

Figure 4:
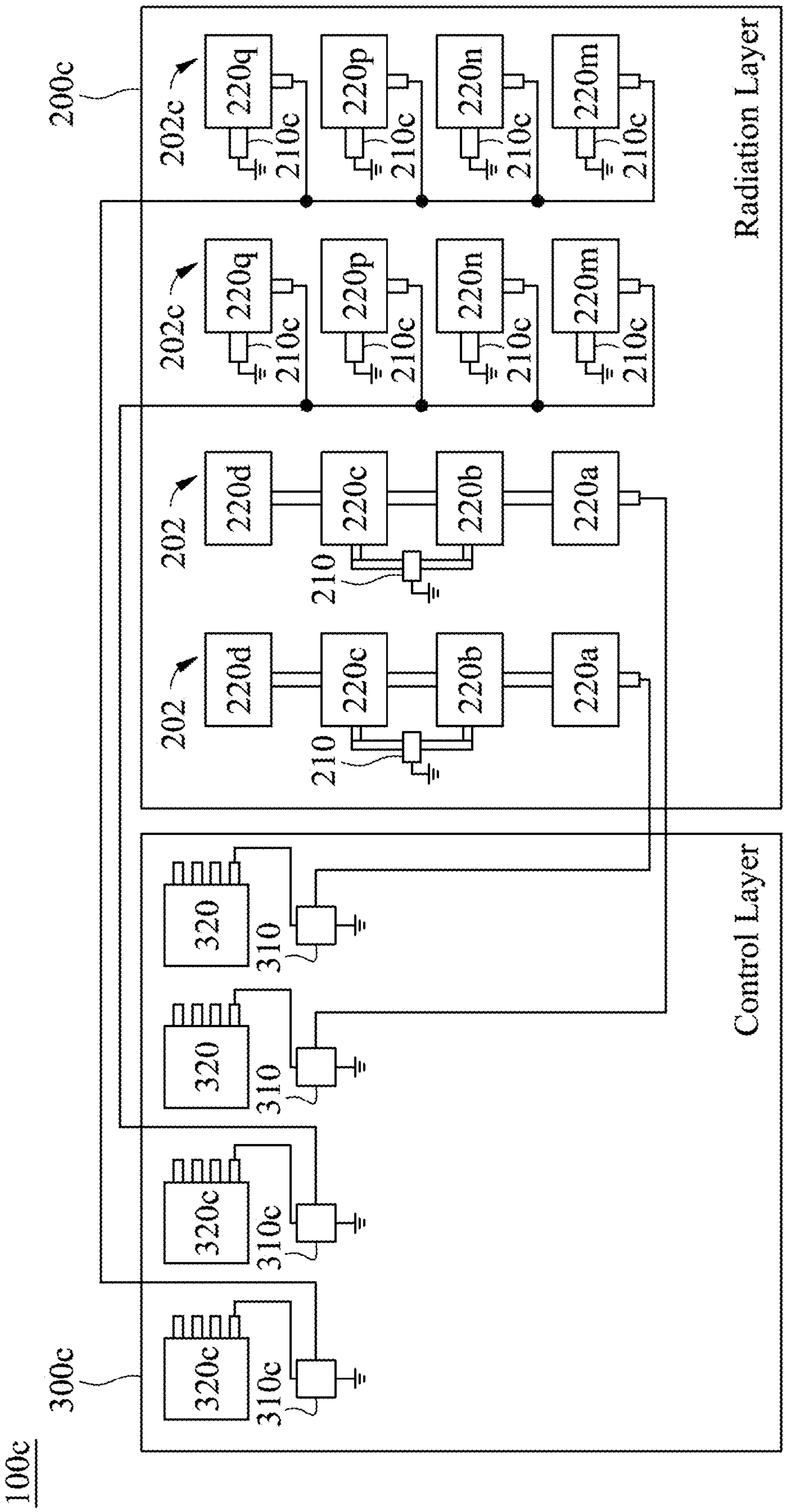
FIG. 4 shows a schematic view of a system having a RRA structure according to a fourth embodiment of the present disclosure.

Reference is made to FIGS. 1 and 4. FIG. 4 shows a schematic view of a system 100*c* having a RRA structure according to a fourth embodiment of the present disclosure. The system 100*c* having the RRA structure includes a radiation layer 200*c* and a control layer 300*c*. The radiation layer 200*c* includes two first radiation modules (i.e., the radiation modules 202) and two second radiation modules 202*c*. Each of the two first radiation modules (i.e., the radiation modules 202) includes a first P-I-N diode (i.e., the P-I-N diode 210) and a plurality of first reconfigurable reflective units (i.e., the reconfigurable reflective units 220*a*-220*d*). The structure of each of the two first radiation modules is the same as the structure of each of the radiation modules 202 in FIG. 1, and will not be described again herein. Each of the two second radiation modules 202*c* includes four second P-I-N diodes 210*c* and four second reconfigurable reflective units 220*m*, 220*n*, 220*p*, 220*q* (220*m*-220*q*). The four second reconfigurable reflective units 220*m*-220*q* are electrically connected to the four second P-I-N diodes 210*c*, respectively. In addition, the control layer 300*c* includes two first switch elements (i.e., the switch elements 310), two second switch elements 310*c*, two first control units (i.e., the control units 320) and two second control units 320*c*. The two first switch elements (i.e., the switch elements 310) are electrically connected to the radiation layer 200*c*. The two second switch elements 310*c* are electrically connected to the radiation layer 200*c*. The two first control units (i.e., the control units 320) are electrically connected to the two first switch elements (i.e., the switch elements 310). The two second control units 320*c* are electrically connected to the two second switch elements 310*c*. The structures of the two first switch elements (i.e., the switch elements 310) and the two first control units (i.e., the control units 320) are the same as the structures of the switch elements 310 and the control units 320 in FIG. 1, and will not be described again herein.

The number of the second reconfigurable reflective units 220*m*-220*q* is different from the number of the second switch element 310*c*. The number of the second reconfigurable reflective units 220*m*-220*q* is the same as the number of the second P-I-N diodes 210*c*. For example, in the second radiation module 202*c*, the second reconfigurable reflective units 220*m*-220*q* are arranged into a 4×1 one-dimensional array. The number of the second reconfigurable reflective units 220*m*-220*q* is 4, and the number of the second P-I-N diodes 210*c* is 4. The number of the second switch element 310*c* corresponding to the second radiation module 202*c* is 1, and the number of the second control unit 320*c* corresponding to the second radiation module 202*c* is 1. In other words, the number of the second reconfigurable reflective units 220*m*-220*q* is greater than the number of the second switch element 310*c*. The number of the second P-I-N diodes 210*c* is greater than the number of the second switch element 310*c*. In addition, the second reconfigurable reflective units 220*m*-220*q* are connected to the second switch element 310*c*. The two second control units 320*c* generate two second control signals. The two second switch elements 310*c* receive the two second control signals and control the second reconfigurable reflective units 220*m*-220*q* according to the two second control signals.

Figure 5:
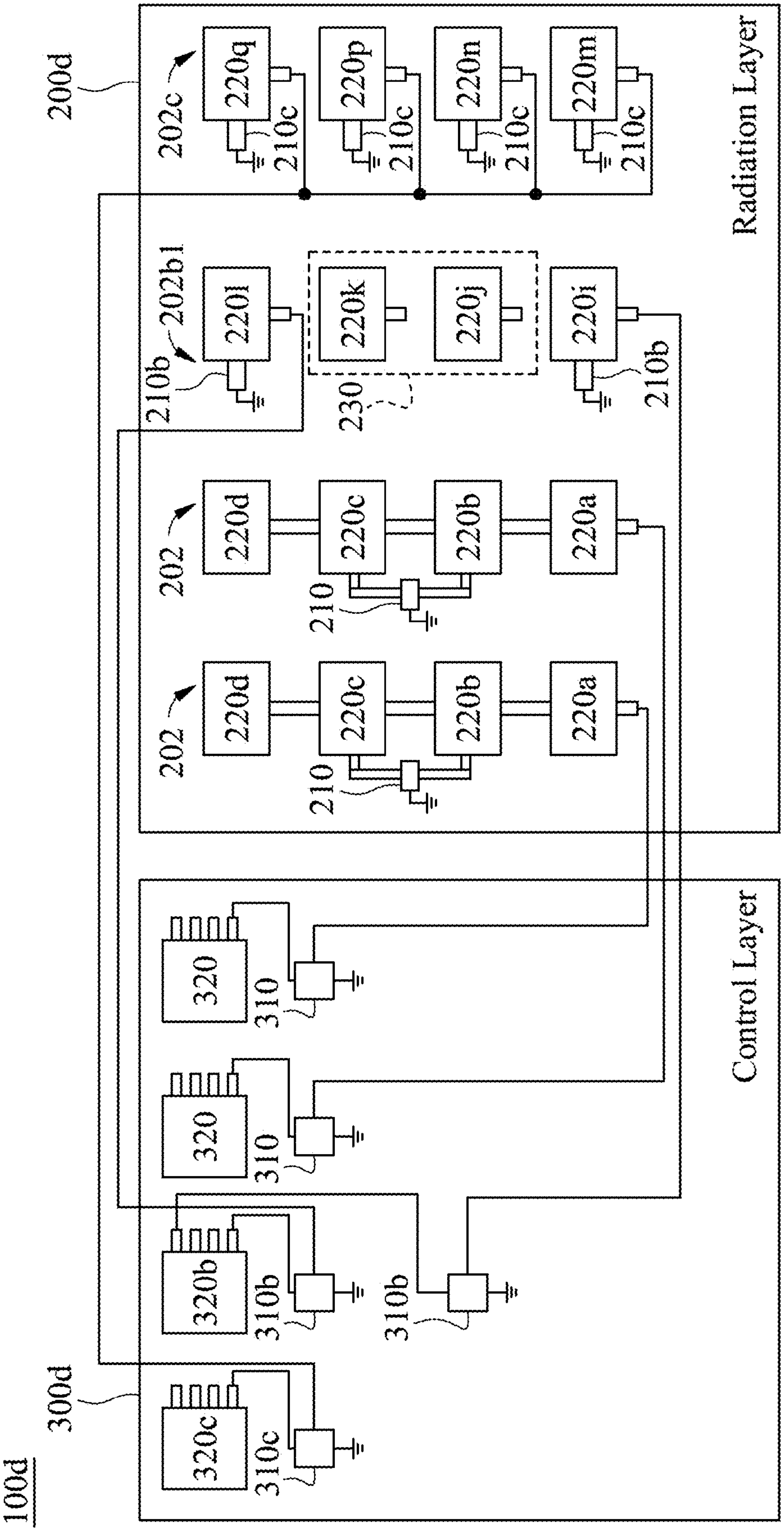
FIG. 5 shows a schematic view of a system having a RRA structure according to a fifth embodiment of the present disclosure.

Reference is made to FIGS. 3, 4 and 5. FIG. 5 shows a schematic view of a system 100*d* having a RRA structure according to a fifth embodiment of the present disclosure. The system 100*d* having the RRA structure includes a radiation layer 200*d* and a control layer 300*d*. The radiation layer 200*d* includes two first radiation modules (i.e., the radiation modules 202), a second radiation module 202*b*1 and a second radiation module 202*c*. The control layer 300*d* includes two first switch elements (i.e., the switch elements 310), two second switch elements 310*b*, a second switch element 310*c*, two first control units (i.e., the control units 320), a second control unit 320*b* and a second control unit 320*c*. The structures of the two first radiation modules (i.e., the radiation modules 202), the second radiation module 202*c*, the two first switch elements (i.e., the switch elements 310), the second switch element 310*c*, the two first control units (i.e., the control units 320) and the second control unit 320*c* are the same as the structures of the two first radiation modules (i.e., the radiation modules 202), the second radiation module 202*c*, the two first switch elements (i.e., the switch elements 310), the second switch element 310*c*, the two first control units (i.e., the control units 320) and the second control unit 320*c* in FIG. 4. The structures of the second radiation module 202*b*1, the two second switch elements 310*b* and the second control unit 320*b* are the same as the structures of the second radiation module 202*b*1, the two second switch elements 310*b* and the second control unit 320*b* in FIG. 3, and will not be described again herein.

Figure 6:
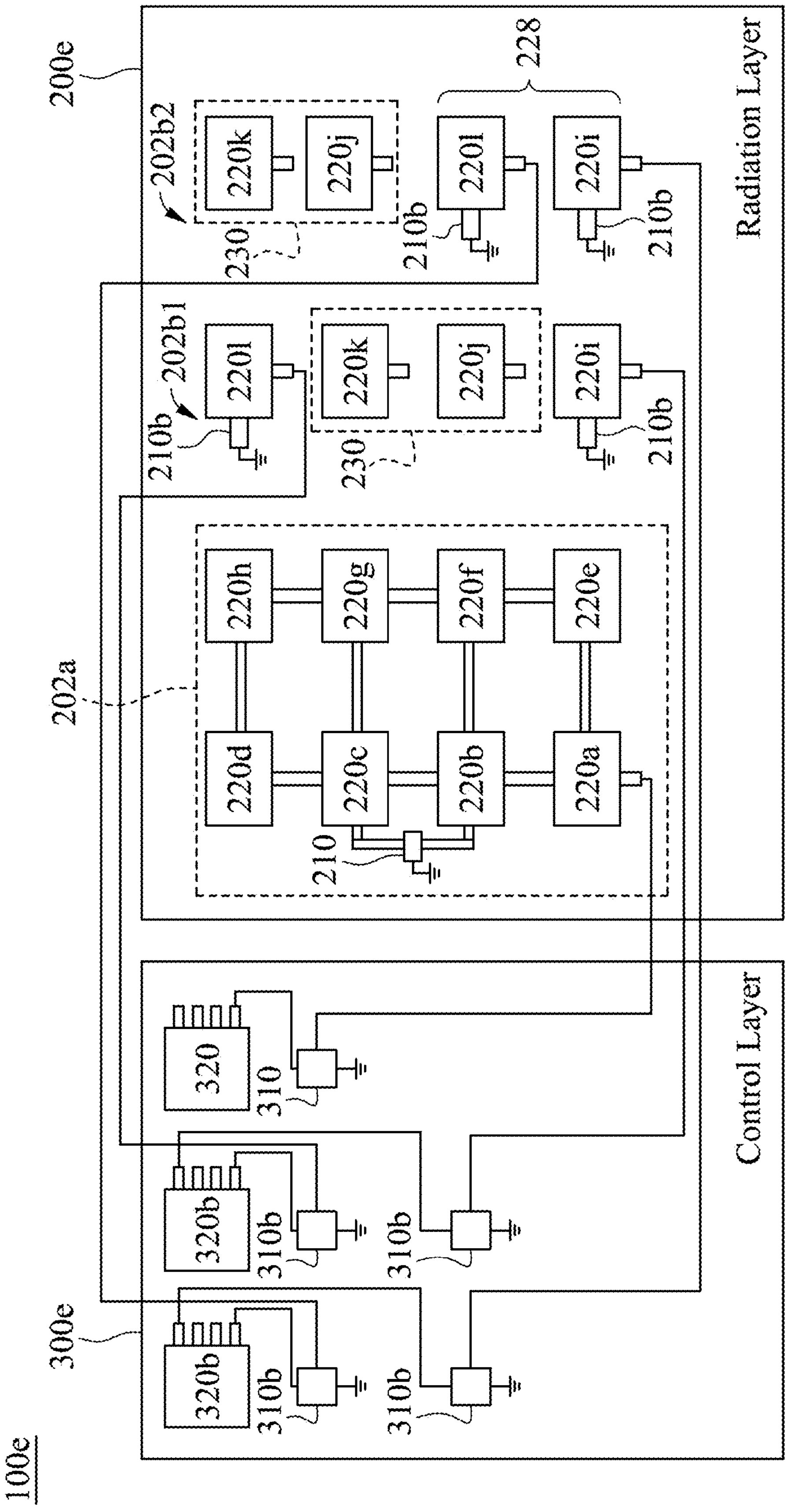
FIG. 6 shows a schematic view of a system having a RRA structure according to a sixth embodiment of the present disclosure.

Reference is made to FIGS. 2, 3 and 6. FIG. 6 shows a schematic view of a system 100*e* having a RRA structure according to a sixth embodiment of the present disclosure. The system 100*e* having the RRA structure includes a radiation layer 200*e* and a control layer 300*e*. The radiation layer 200*e* includes a first radiation module (i.e., the radiation module 202*a*) and two second radiation modules 202*b*1, 202*b*2. The control layer 300*e* includes a first switch element (i.e., the switch element 310), four second switch elements 310*b*, a first control unit (i.e., the control unit 320) and two second control units 320*b*. The structures of the first radiation module (i.e., the radiation module 202*a*), the first switch element (i.e., the switch element 310) and the first control unit (i.e., the control unit 320) are the same as the structures of the first radiation module (i.e., the radiation module 202*a*), the first switch element (i.e., the switch element 310) and the first control unit (i.e., the control unit 320) in FIG. 2. The structures of the two second radiation modules 202*b*1, 202*b*2, the four second switch elements 310*b* and the two second control units 320*b* are the same as the structures of the two second radiation modules 202*b*1, 202*b*2, the four second switch elements 310*b* and the two second control units 320*b* in FIG. 3, and will not be described again herein.

Figure 7:
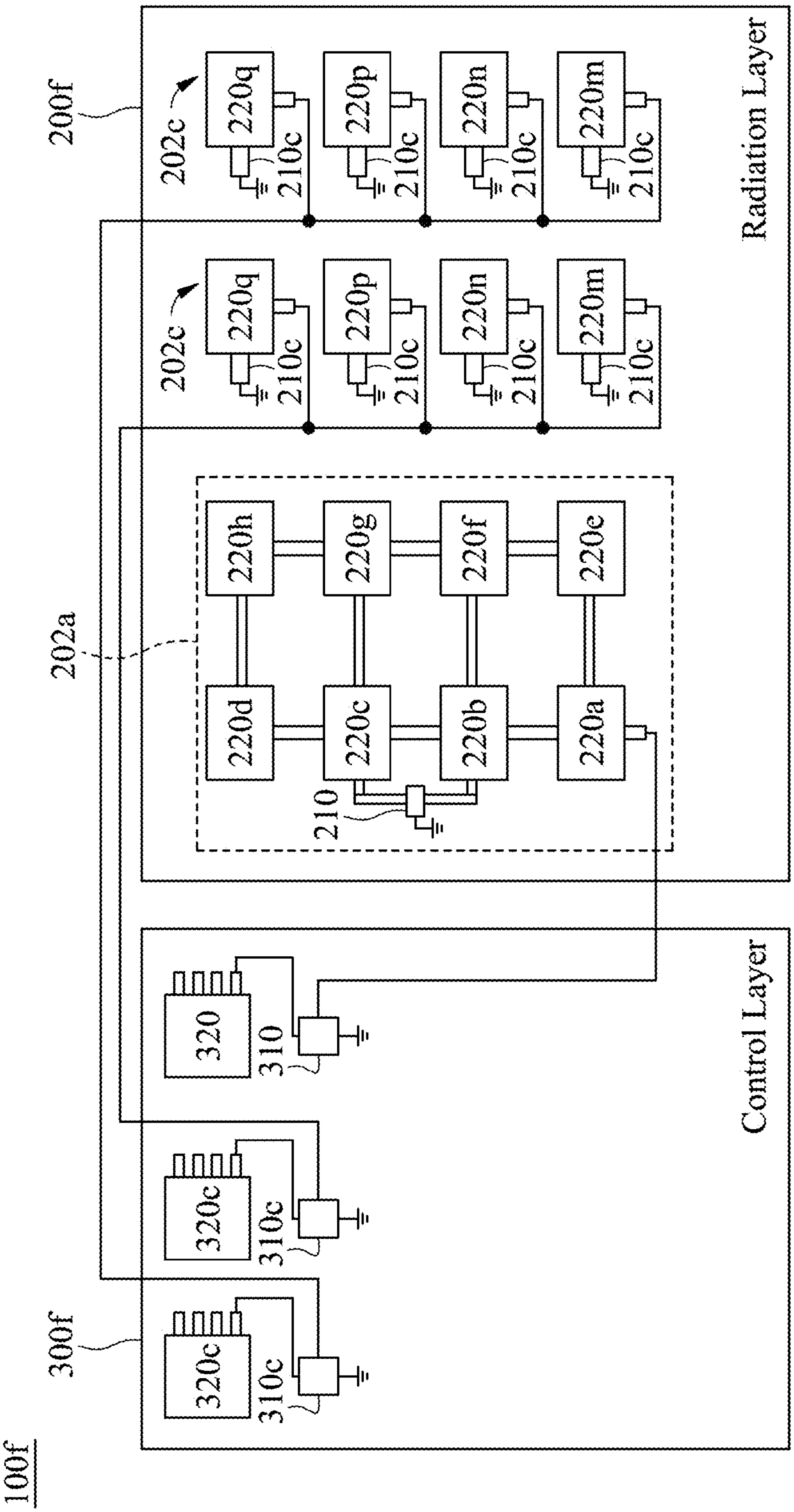
FIG. 7 shows a schematic view of a system having a RRA structure according to a seventh embodiment of the present disclosure.

Reference is made to FIGS. 2, 4 and 7. FIG. 7 shows a schematic view of a system 100*f* having a RRA structure according to a seventh embodiment of the present disclosure. The system 100*f* having the RRA structure includes a radiation layer 200*f* and a control layer 300*f*. The radiation layer 200*f* includes a first radiation module (i.e., the radiation module 202*a*) and two second radiation modules 202*c*. The control layer 300*f* includes a first switch element (i.e., the switch element 310), two second switch elements 310*c*, a first control unit (i.e., the control unit 320) and two second control units 320*c*. The structures of the first radiation module (i.e., the radiation module 202*a*), the first switch element (i.e., the switch element 310) and the first control unit (i.e., the control unit 320) are the same as the structures of the first radiation module (i.e., the radiation module 202*a*), the first switch element (i.e., the switch element 310) and the first control unit (i.e., the control unit 320) in FIG. 2. The structures of the two second radiation modules 202*c*, the two second switch elements 310*c* and the two second control units 320*c* are the same as the structures of the two second radiation modules 202*c*, the two second switch elements 310*c* and the two second control units 320*c* in FIG. 4, and will not be described again herein.

Figure 8:
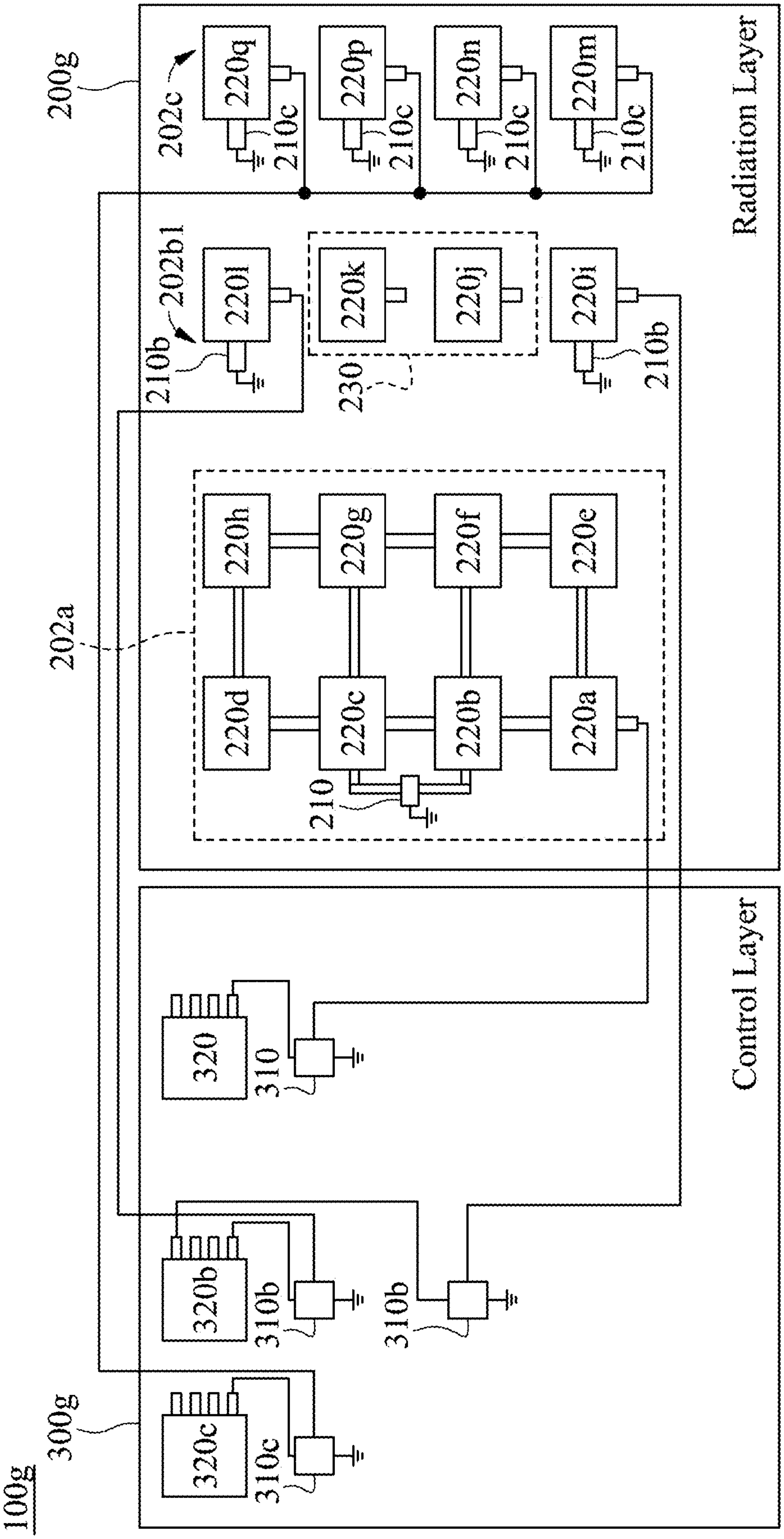
FIG. 8 shows a schematic view of a system having a RRA structure according to an eighth embodiment of the present disclosure.

Reference is made to FIGS. 2, 5 and 8. FIG. 8 shows a schematic view of a system 100*g* having a RRA structure according to an eighth embodiment of the present disclosure. The system 100*g* having the RRA structure includes a radiation layer 200*g* and a control layer 300*g*. The radiation layer 200*g* includes a first radiation module (i.e., the radiation module 202*a*), a second radiation module 202*b*1 and a second radiation module 202*c*. The control layer 300*g* includes a first switch element (i.e., the switch element 310), two second switch elements 310*b*, a second switch element 310*c*, a first control unit (i.e., the control unit 320), a second control unit 320*b* and a second control unit 320*c*. The structures of the first radiation module (i.e., the radiation module 202*a*), the first switch element (i.e., the switch element 310) and the first control unit (i.e., the control unit 320) are the same as the structures of the first radiation module (i.e., the radiation module 202*a*), the first switch element (i.e., the switch element 310) and the first control unit (i.e., the control unit 320) in FIG. 2. The structures of the second radiation modules 202*b*1, the second radiation module 202*c*, the two second switch elements 310*b*, the second switch element 310*c*, the second control unit 320*b* and the second control unit 320*c* are the same as the structures of the second radiation modules 202*b*1, the second radiation module 202*c*, the two second switch elements 310*b*, the second switch element 310*c*, the second control unit 320*b* and the second control unit 320*c* in FIG. 5, and will not be described again herein.

Figure 9:
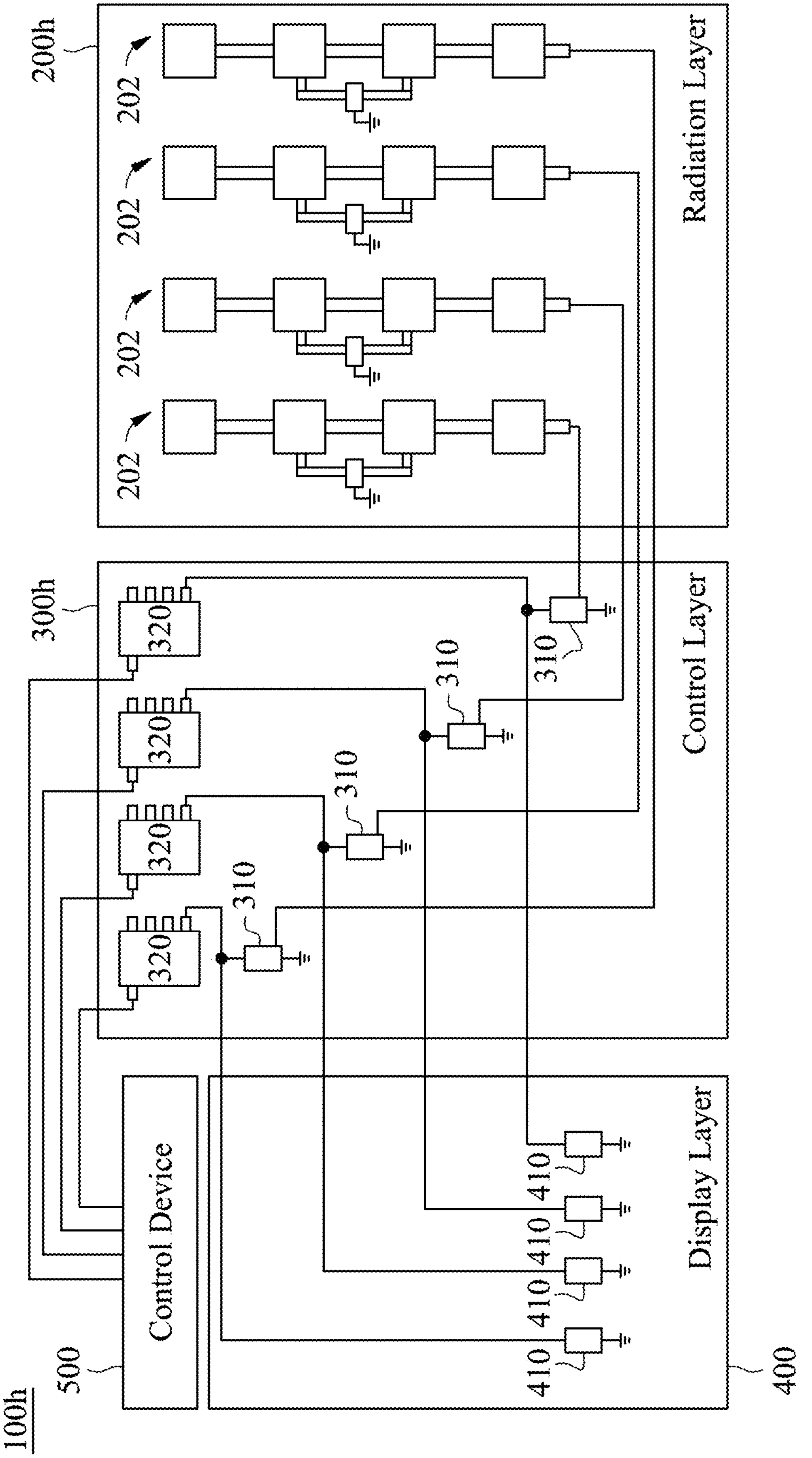
FIG. 9 shows a schematic view of a system having a RRA structure according to a ninth embodiment of the present disclosure.

Reference is made to FIGS. 1 and 9. FIG. 9 shows a schematic view of a system 100*h* having a RRA structure according to a ninth embodiment of the present disclosure. The system 100*h* having the RRA structure includes a radiation layer 200*h*, a control layer 300*h*, a display layer 400 and a control device 500. The structures of the radiation layer 200*h* and the control layer 300*h* are the same as the structures of the radiation layer 200 and the control layer 300 in FIG. 1, and will not be described again herein. The display layer 400 is electrically connected to the switch elements 310 and the control units 320 of the control layer 300*h*, and includes four display elements 410. The four display elements 410 receive four control signals from the control units 320 and are controlled by the four control signals. In addition, the control device 500 is electrically connected to the control units 320 and provides a plurality of global control signals to the control units 320 to control all of the reconfigurable reflective units on the radiation layer 200*h* (i.e., the reconfigurable reflective units 220*a*-220*d*, as shown in FIG. 1).

Figure 10:
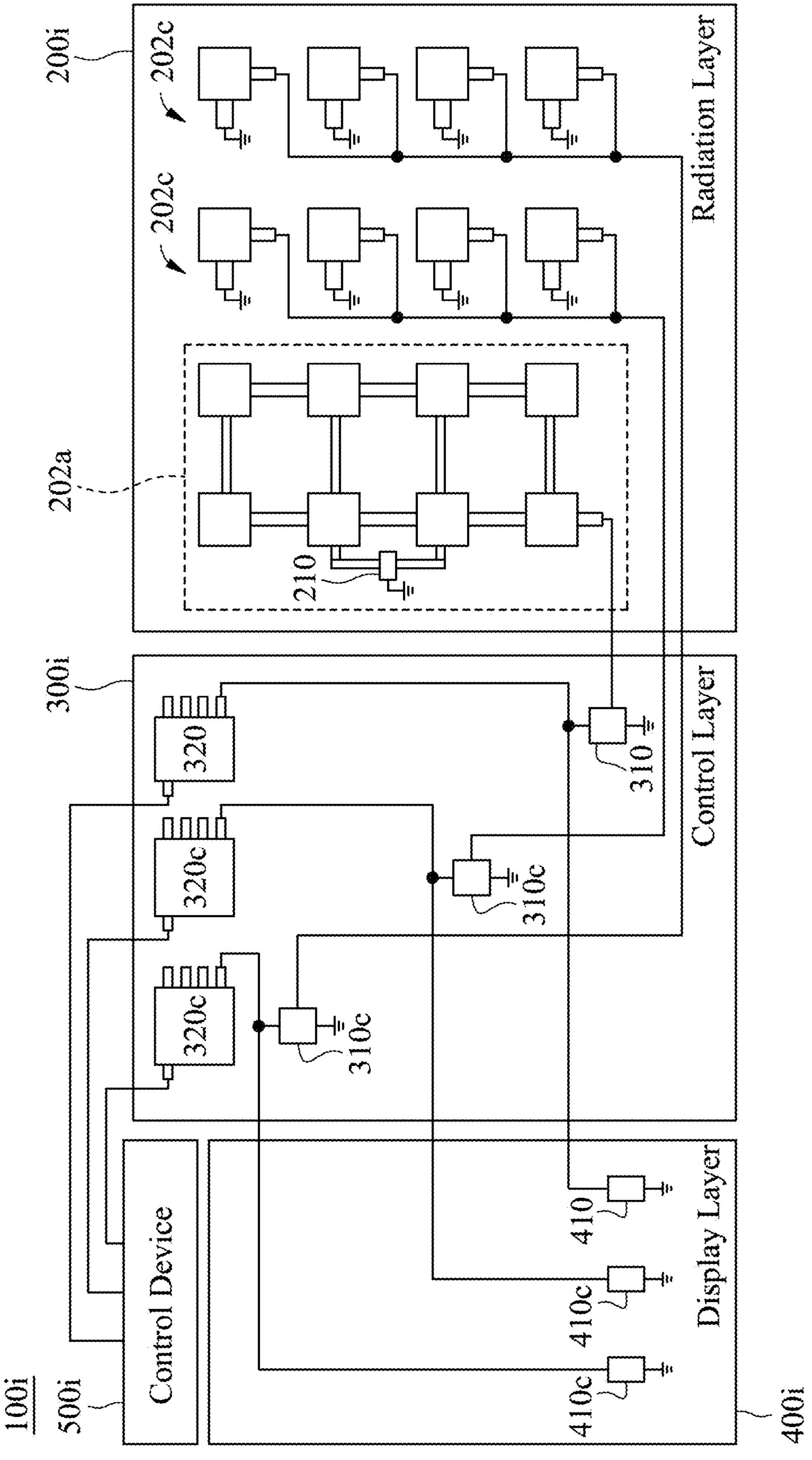
FIG. 10 shows a schematic view of a system having a RRA structure according to a tenth embodiment of the present disclosure.

Reference is made to FIGS. 7 and 10. FIG. 10 shows a schematic view of a system 100*i* having a RRA structure according to a tenth embodiment of the present disclosure. The system 100*i* having the RRA structure includes a radiation layer 200*i*, a control layer 300*i*, a display layer 400*i* and a control device 500*i*. The structures of the radiation layer 200*i* and the control layer 300*i* are the same as the structures of the radiation layer 200*f* and the control layer 300*f* in FIG. 7, and will not be described again herein. The display layer 400*i* includes a first display element (i.e., the display element 410) and two second display elements 410*c*. The first display element (i.e., the display element 410) is electrically connected to a first switch element (i.e., the switch element 310) and a first control unit (i.e., the control unit 320) of the control layer 300*i*. The first display element (i.e., the display element 410) receives a first control signal from the first control unit (i.e., the control unit 320) and is controlled by the first control signal. The two second display elements 410*c* are electrically connected to the second switch elements 310*c* and the second control units 320*c* of the control layer 300*i*. The two second display elements 410*c* receive second control signals from the second control units 320*c* and are controlled by the second control signals. In addition, the control device 500*i* is electrically connected to the first control unit (i.e., the control unit 320) and the second control units 320*c*. The control device 500*i* provides a plurality of global control signals to the first control unit (i.e., the control unit 320) and the second control units 320*c* to control all of the reconfigurable reflective units on the radiation layer 200*i* (i.e., the reconfigurable reflective units 220*a*-220*h* and the second reconfigurable reflective units 220*m*-220*q*, as shown in FIG. 7).

Figure 11:
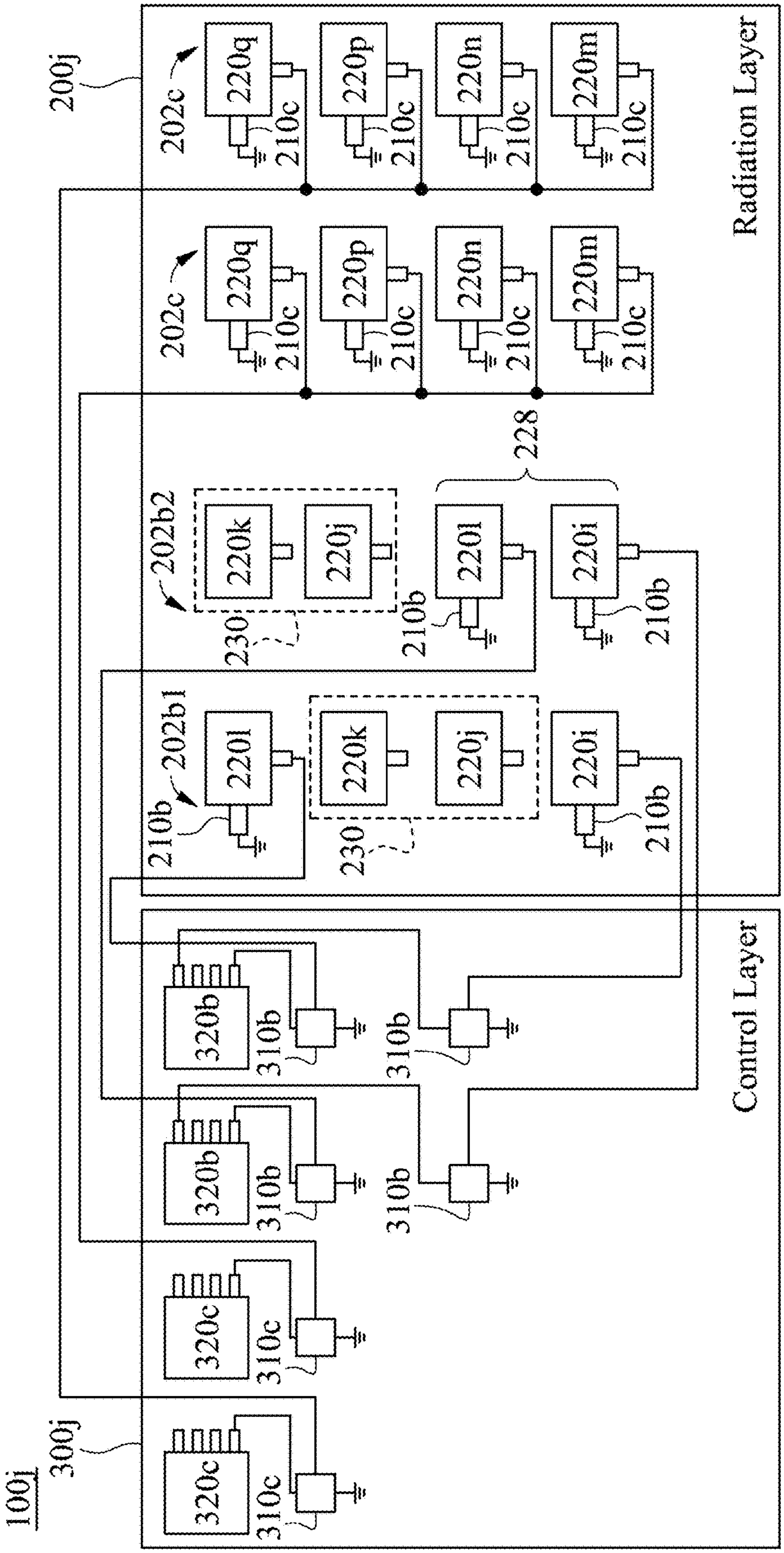
FIG. 11 shows a schematic view of a system having a RRA structure according to an eleventh embodiment of the present disclosure.

Reference is made to FIGS. 3, 4 and 11. FIG. 11 shows a schematic view of a system 100*j* having a RRA structure according to an eleventh embodiment of the present disclosure. The system 100*j* having the RRA structure includes a radiation layer 200*j* and a control layer 300*j*. The radiation layer 200*j* includes two first radiation modules (i.e., the second radiation modules 202*b*1, 202*b*2) and two second radiation modules 202*c*. The control layer 300*j* includes four first switch elements (i.e., the second switch elements 310*b*), two second switch elements 310*c*, two first control units (i.e., the second control units 320*b*) and two second control units 320*c*. The structures of the two first radiation modules (i.e., the second radiation modules 202*b*1, 202*b*2), the four first switch elements (i.e., the second switch elements 310*b*) and the two first control units (i.e., the second control units 320*b*) are the same as the structures of the second radiation modules 202*b*1, 202*b*2, the second switch elements 310*b* and the second control units 320*b* in FIG. 3. The structures of the two second radiation modules 202*c*, the two second switch elements 310*c* and the two second control units 320*c* are the same as the structures of the second radiation modules 202*c*, the second switch elements 310*c* and the second control units 320*c* in FIG. 4, and will not be described again herein.

Figure 12A:
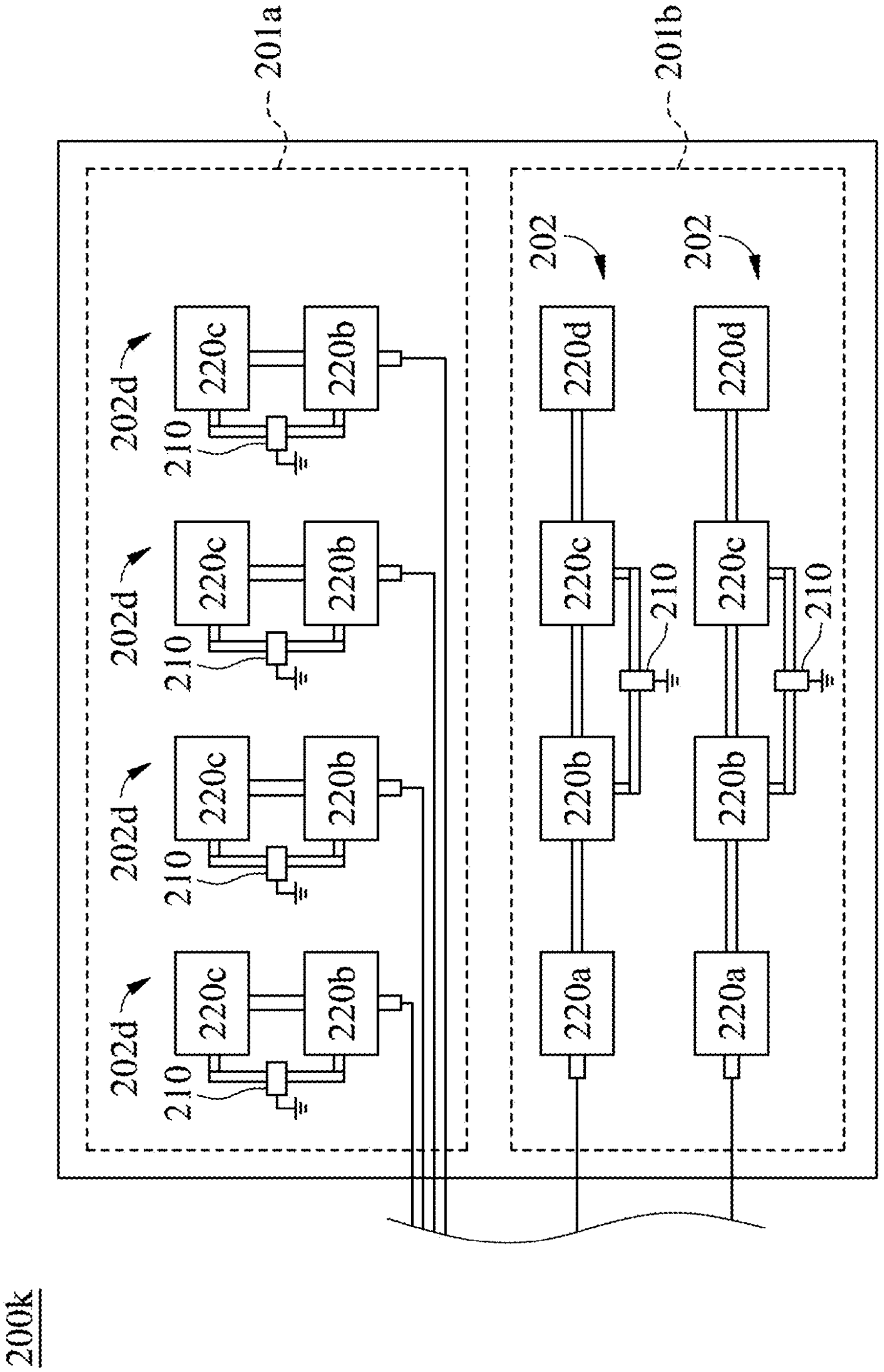
FIG. 12A shows a schematic view of a radiation layer according to a twelfth embodiment of the present disclosure.
Figure 12B:
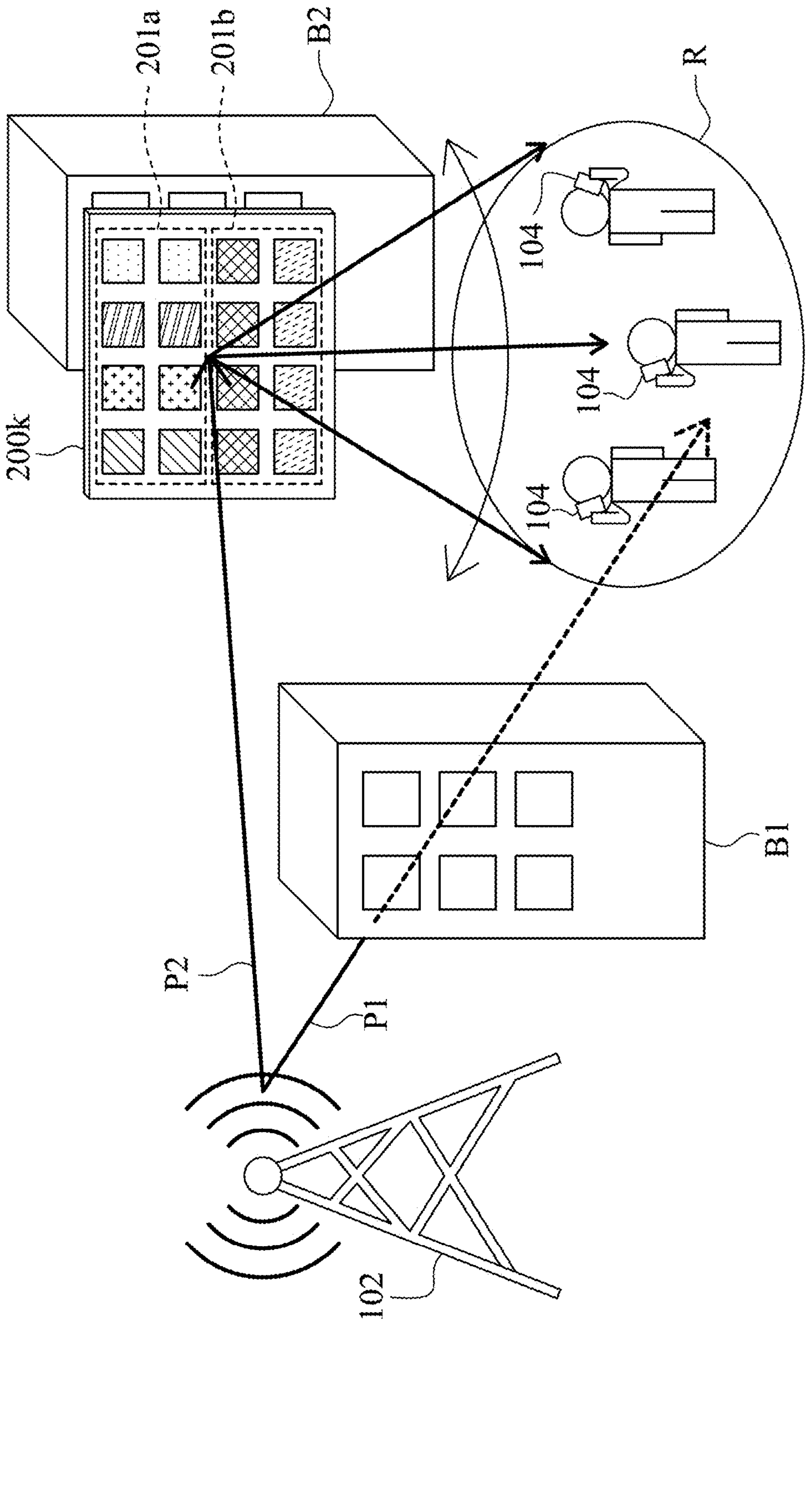
FIG. 12B shows a schematic view of the radiation layer of FIG. 12A applied to outdoors.

Reference is made to FIGS. 1, 12A and 12B. FIG. 12A shows a schematic view of a radiation layer 200*k* according to a twelfth embodiment of the present disclosure. FIG. 12B shows a schematic view of the radiation layer 200*k* of FIG. 12A applied to outdoors. There are the radiation layer 200*k*, a base station 102, a plurality of User Equipment (UE) 104, a first building B1 and a second building B2 in the outdoors. The radiation layer 200*k* is disposed on the second building B2 and includes a first radiation assembly 201*a* and a second radiation assembly 201*b*. The first radiation assembly 201*a* includes four first radiation modules 202*d*. Each of the four first radiation modules 202*d* includes a first P-I-N diode (i.e., the P-I-N diode 210) and two first reconfigurable reflective units (i.e., the reconfigurable reflective units 220*b*, 220*c*). The structures of the first P-I-N diode and the two first reconfigurable reflective units are the same as the structures of the P-I-N diode 210 and the reconfigurable reflective units 220*b*, 220*c* in FIG. 1, and will not be described again herein. The second radiation assembly 201*b* includes two second radiation modules (i.e., the radiation modules 202). The structure of each of the two second radiation modules (i.e., the radiation modules 202) is the same as the structure of the radiation module 202 in FIG. 1, and will not be described again herein. The reflection phases of the four first radiation modules 202*d* and the two second radiation modules (i.e., the radiation modules 202) are different from each other. Each of the four first radiation modules 202*d* and the two second radiation modules (i.e., the radiation modules 202) shares one P-I-N diode 210.

In FIG. 12B, the base station 102 originally transmits the signal to the user equipment 104 along a first path P1. However, the first path P1 is blocked by the first building B1. Hence, the signal may be transmitted to the user equipment 104 along a second path P2 through the radiation layer 200*k* on the second building B2. The first radiation assembly 201*a* of the radiation layer 200*k* is configured to determine the left and right change, and the second radiation assembly 201*b* of the radiation layer 200*k* is configured to determine the tilt angle, thereby enabling the user equipment 104 located in the area R to effectively transmit the signal.

The structures of the radiation layers 200, 200*a*, 200*b*, 200*c*, 200*d*, 200*e*, 200*f*, 200*g*, 200*h*, 200*i*, 200*j*, 200*k* of the present disclosure can be regarded as the RRA structures. For example, in a conventional 4×4 RRA structure (i.e., 16 reconfigurable reflective units), the number of P-I-N diodes of a radiation layer is 16; the number of switch elements and the number of control units of a control layer are 16 and 4, respectively; and the number of display elements of a display layer is 16. The above-mentioned numbers of the P-I-N diodes, the switch elements, the control units and the display elements may affect the power consumption of the entire system. On the contrary, the structures of the first to twelfth embodiments in the present disclosure compared with the conventional structure have fewer number of the P-I-N diodes, the switch elements, the control units or the display elements, so that the power consumption of the entire system of the present disclosure can be significantly reduced.

In the above embodiments, the reconfigurable reflective units 220*a*-220*h* and the second reconfigurable reflective units 220*i*-220*l*, 220*m*-220*q* can be made of metal and have any shape suitable for the RIS technology. One of the switch element 310 and the second switch elements 310*b*, 310*c* can be a Bipolar Junction Transistor (BJT) or a Metal Oxide Semiconductor Field Effect Transistor (MOSFET). One of the control unit 320 and the second control unit 320*b* can be a shift register or a Field Programmable Gate Array (FPGA). One of the display element 410 and the second display element 410*c* can be a Light-Emitting Diode (LED) and determine whether to emit light according to the control signal and the second control signal. One of the control devices 500, 500*i* can be an Arduino device, a Central Processing Unit (CPU) or other computing processor. The user equipment 104 can be a cell phone or a mobile device. One of the radiation layer, the control layer and a display layer can be a circuit board. However, the present disclosure is not limited thereto.

Figure 13:
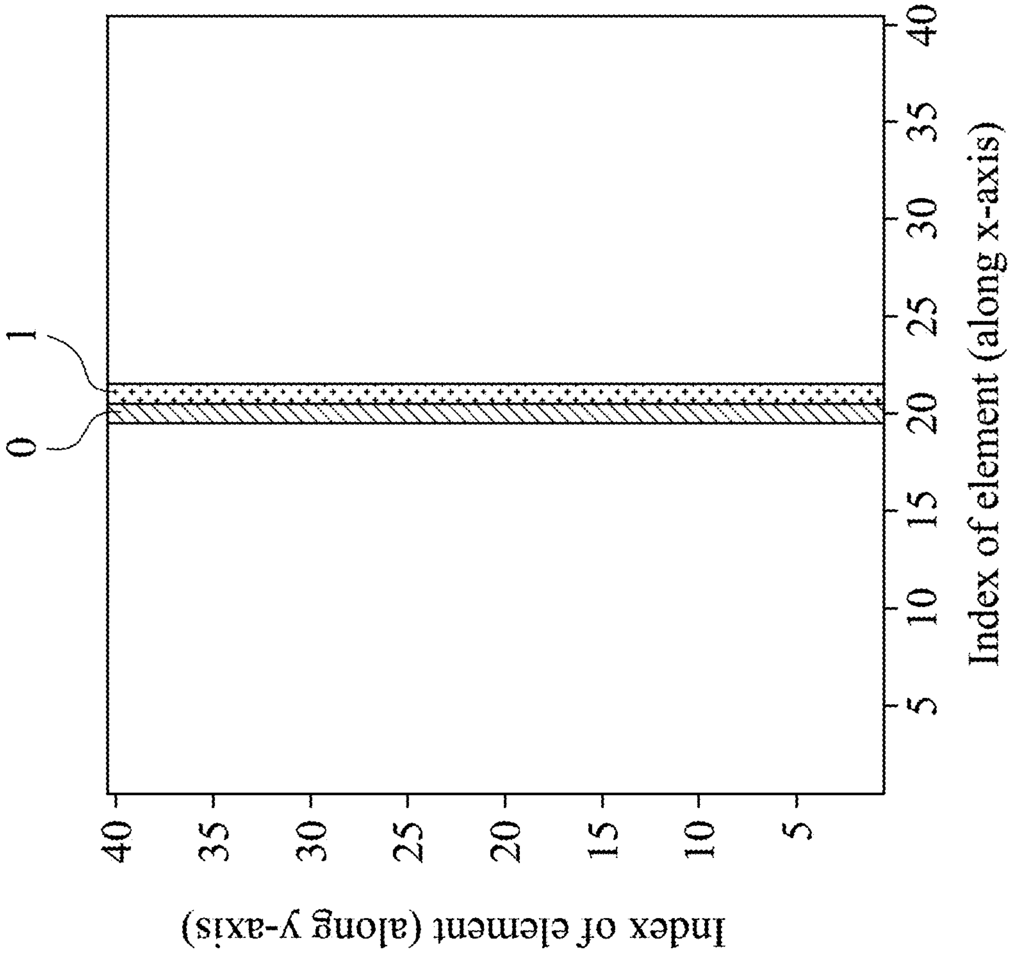
FIG. 13 shows a schematic view of phase distribution corresponding to an element array of a radiation layer according to a thirteenth embodiment of the present disclosure.

Reference is made to FIGS. 3 and 13. FIG. 13 shows a schematic view of phase distribution corresponding to an element array (40×40) of a radiation layer according to a thirteenth embodiment of the present disclosure. In the present disclosure, under a restrictive condition (e.g., an angle range from 1 degree to 60 degrees), phases at certain positions are constant (not to be changed). In general, there are two types of base station distances RIS, i.e., a first base station distance RIS=1 m and a second base station distance RIS=999999 m. FIG. 13 shows the phase distribution corresponding to the second base station distance RIS=999999 m. In FIG. 13, each of the two central areas (Index of element (along x-axis)=20, 21) corresponds to the constant phase when the angle range is from 1 degree to 60 degrees. In detail, the phase of one of the two central areas (Index of element (along x-axis)=20) is all 0, and the phase of the other of the two central areas (Index of element (along x-axis)=21) is all 1. Therefore, the present disclosure utilizes the units without any switching element (e.g., the fifth radiating portion 230 in FIG. 3) at positions where the phases are not changed, thereby being capable of saving power consumption and manufacturing costs.

Figure 14A:
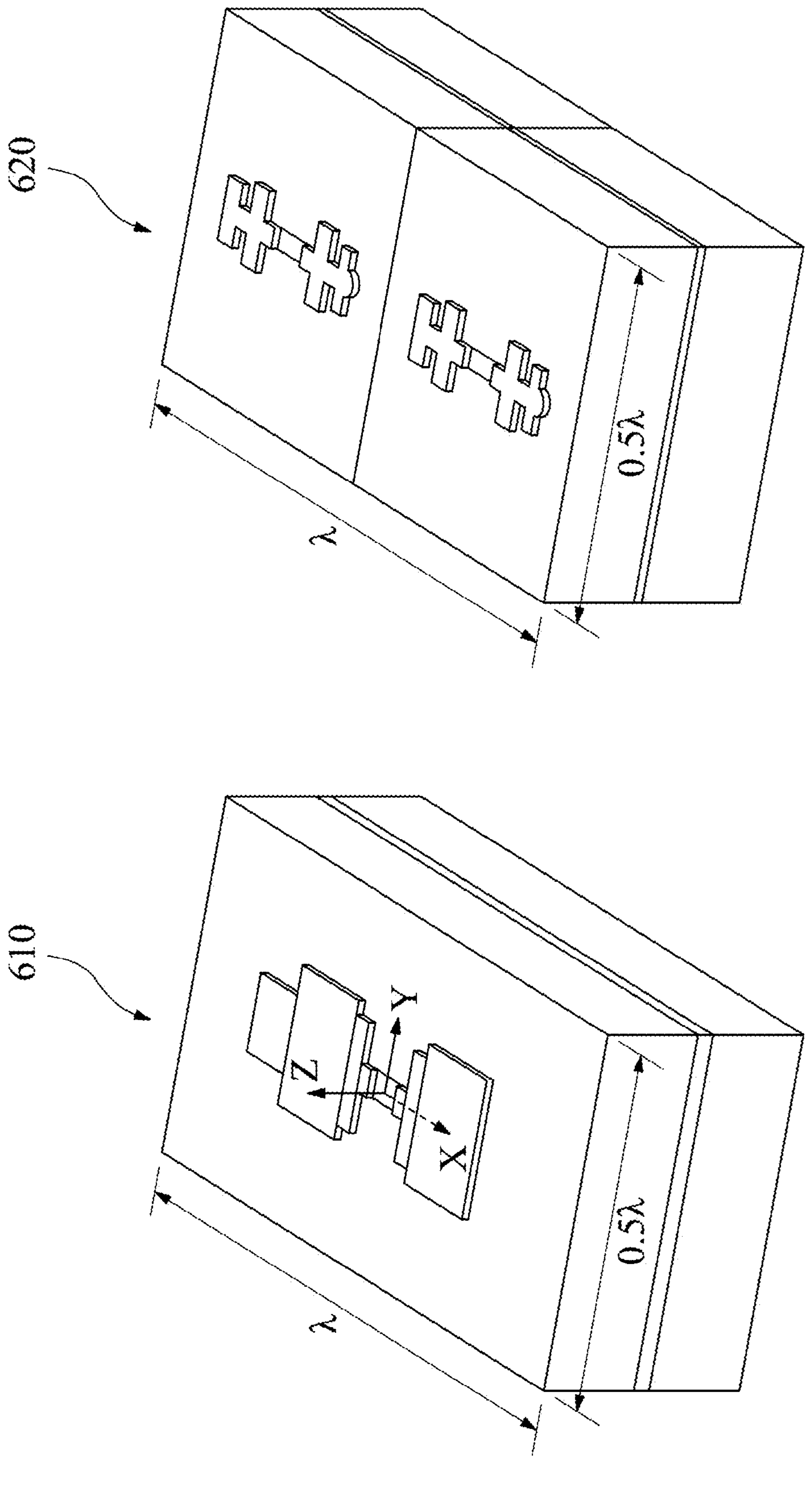
FIG. 14A shows a three-dimensional schematic view of an integrated element and a dumbbell element group of a radiation layer according to a fourteenth embodiment of the present disclosure.
Figure 14B:
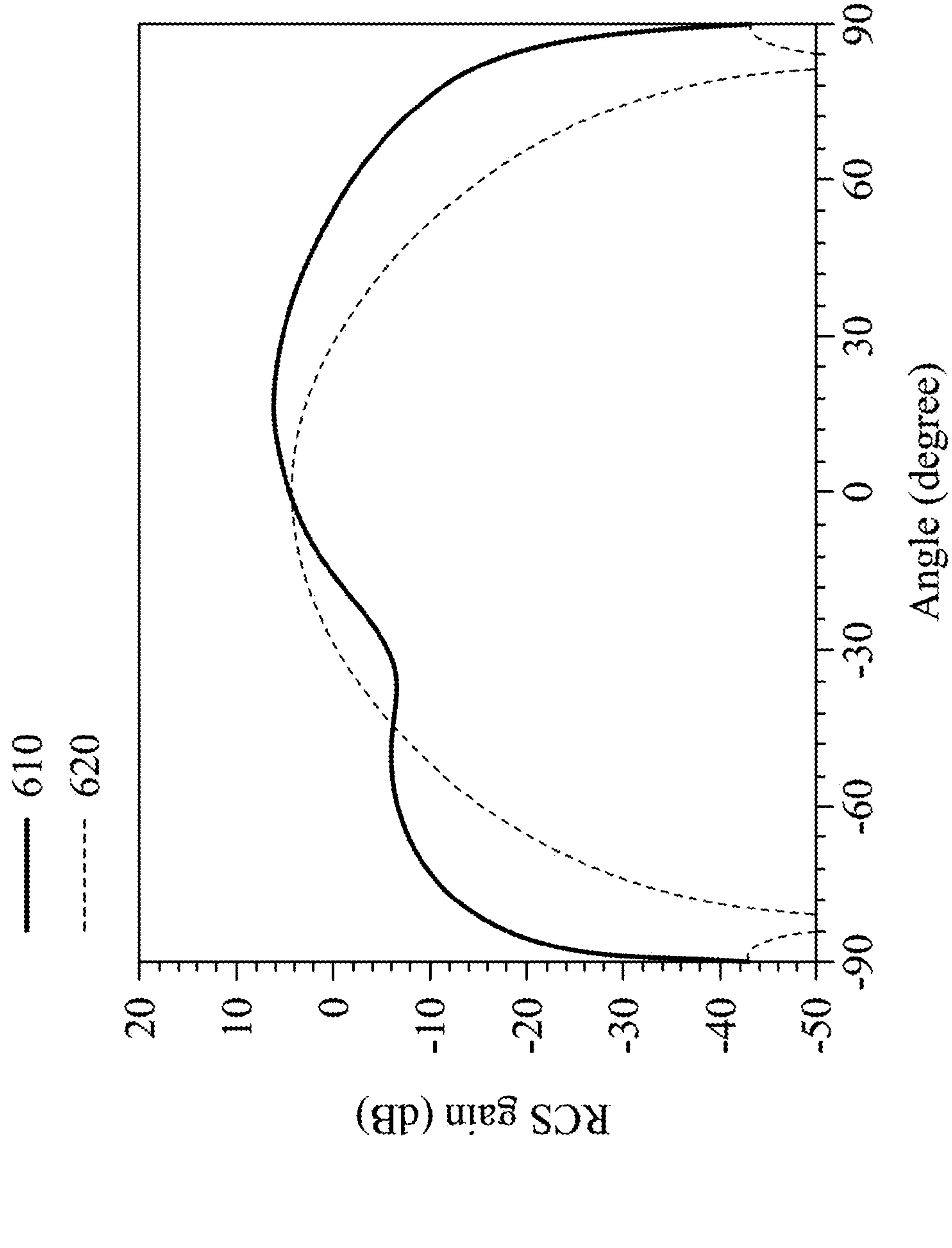
FIG. 14B shows a schematic view of a relationship between a radar cross-section (RCS) gain and an angle of the integrated element and the dumbbell element group of FIG. 14A.
Figure 14C:
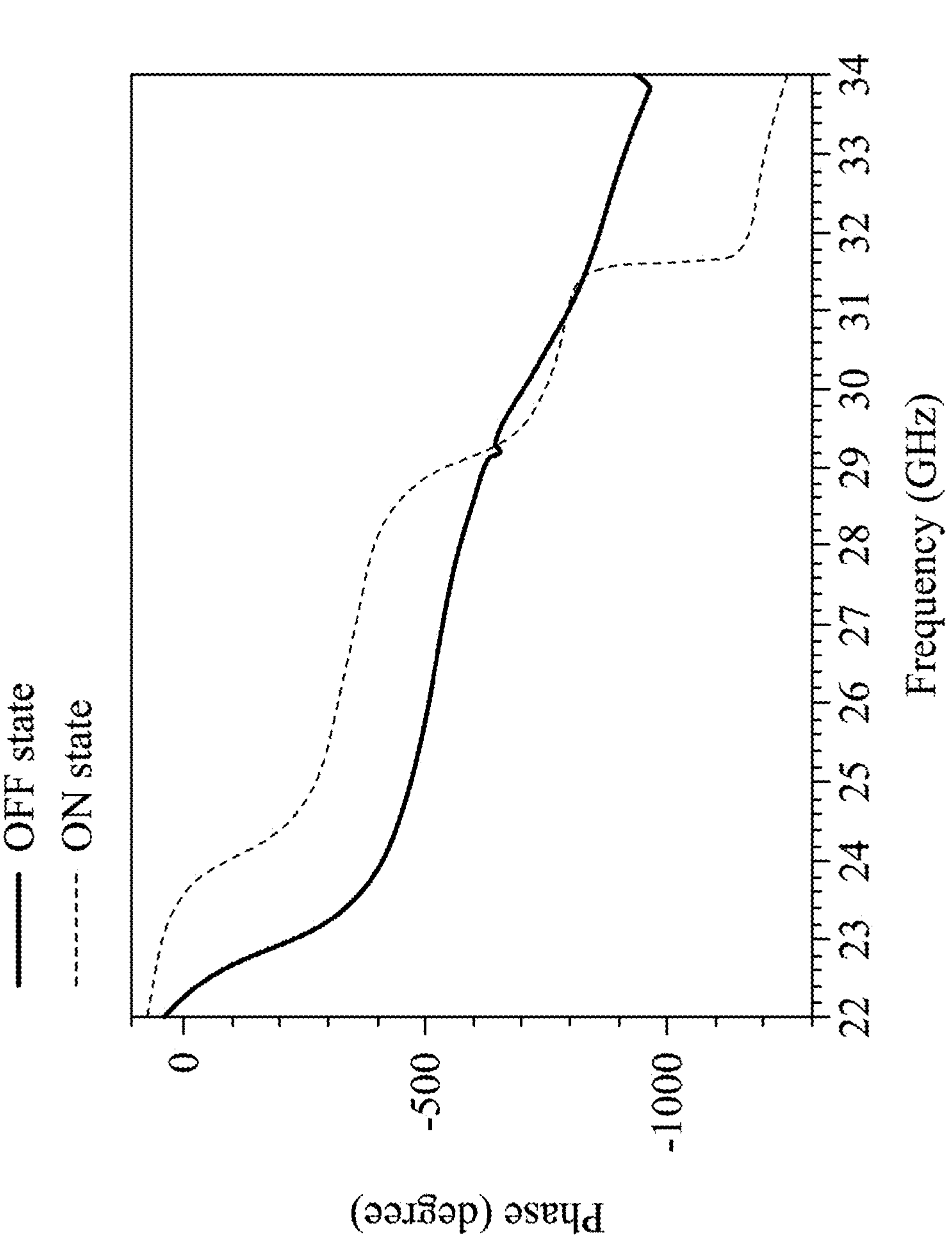
FIG. 14C shows a schematic view of a relationship between a phase and a frequency of the integrated element of FIG. 14A.

Reference is made to FIGS. 1, 14A, 14B and 14C. FIG. 14A shows a three-dimensional schematic view of an integrated element 610 and a dumbbell element group 620 of a radiation layer according to a fourteenth embodiment of the present disclosure. FIG. 14B shows a schematic view of a relationship between a radar cross-section (RCS) gain and an angle of the integrated element 610 and the dumbbell element group 620 of FIG. 14A. FIG. 14C shows a schematic view of a relationship between a phase and a frequency of the integrated element 610 of FIG. 14A. The dumbbell element group 620 includes two dumbbell elements. When the two dumbbell elements form the element array, there is one more switching element per half-wavelength spacing (i.e., 0.5λ). The structure of the switching element may be the same as that of the P-I-N diode 210 in FIG. 1. The present disclosure utilizes the integrated element 610 to implement the concept of low power consumption. The integrated element 610 can achieve the same or similar performance (e.g., 5.04 dB of RCS gain) by using only one switching element under the same size as the dumbbell element group 620. In addition, the bandwidth of the integrated element 610 (the phase difference between ON state and OFF state is about 180 degrees, e.g., 180 degrees plus or minus 20 degrees) is about 25 GHz to 28.6 GHz (3.6 GHz is about 12.9%).

According to the aforementioned embodiments and examples, the advantages of the present disclosure are described as follows.

1. Compared with the conventional structure, the system having the RRA structure of the present disclosure has fewer number of the P-I-N diodes, the switch elements, the control units or the display elements, so that the power consumption, the manufacturing cost and the subsequent maintenance cost of the entire system of the present disclosure can be significantly reduced without affecting the radiation characteristics.
2. The system having the RRA structure of the present disclosure can not only simplify the bias circuit of the control layer, but also make the reconfigurable reflective units of the radiation layer more compact by reducing the number of the P-I-N diodes, the switch elements, the control units or the display elements.
3. The system having the RRA structure of the present disclosure can adaptively adjust the reflection phases via the structural change of the reconfigurable reflective units of the radiation layer.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A system having a Reconfigurable ReflectArray (RRA) structure, comprising:

a radiation layer, comprising:

at least one P-Intrinsic-N (P-I-N) diode; and a plurality of reconfigurable reflective units, wherein at least one part of the reconfigurable reflective units is electrically connected to the at least one P-I-N diode; and a control layer, comprising:

at least one switch element electrically connected to the radiation layer; and at least one control unit electrically connected to the at least one switch element;

wherein the reconfigurable reflective units are arranged into a one-dimensional array or a two-dimensional array, a number of the reconfigurable reflective units is greater than a number of the at least one P-I-N diode, the number of the reconfigurable reflective units is greater than a number of the at least one switch element, and the number of the at least one P-I-N diode, the number of the at least one switch element and a number of the at least one control unit are the same.

2. The system having the RRA structure of claim 1, wherein the reconfigurable reflective units comprise:

a first radiating portion connected to the at least one switch element;

a second radiating portion connected to the first radiating portion and the at least one P-I-N diode; and a third radiating portion connected to the second radiating portion.

3. The system having the RRA structure of claim 1, wherein the at least one control unit generates at least one control signal, the at least one switch element receives the at least one control signal and controls the reconfigurable reflective units according to the at least one control signal, and the system having the RRA structure further comprises:

a display layer electrically connected to the at least one switch element and the at least one control unit of the control layer, and comprising at least one display element, wherein the at least one display element receives the at least one control signal and is controlled by the at least one control signal.

4. The system having the RRA structure of claim 1, wherein one part of the reconfigurable reflective units is electrically connected to the at least one P-I-N diode, another part of the reconfigurable reflective units is floating, and the radiation layer further comprises:

a plurality of P-I-N diodes other than the at least one P-I-N diode; and a plurality of reconfigurable reflective units other than the at least one part of the reconfigurable reflective units electrically connected to the other P-I-N diodes, respectively.

5. A system having a Reconfigurable ReflectArray (RRA) structure, comprising:

a radiation layer, comprising:

at least one first P-Intrinsic-N (P-I-N) diode;

at least one second P-I-N diode;

a plurality of first reconfigurable reflective units, wherein at least one part of the first reconfigurable reflective units is electrically connected to the at least one first P-I-N diode; and a plurality of second reconfigurable reflective units, wherein one part of the second reconfigurable reflective units is electrically connected to the at least one second P-I-N diode, and another part of the second reconfigurable reflective units is floating; and a control layer, comprising:

at least one first switch element electrically connected to the radiation layer;

at least one second switch element electrically connected to the radiation layer;

at least one first control unit electrically connected to the at least one first switch element; and at least one second control unit electrically connected to the at least one second switch element;

wherein a number of the first reconfigurable reflective units is different from a number of the at least one first switch element, and a number of the second reconfigurable reflective units is different from a number of the at least one second switch element.

6. The system having the RRA structure of claim 5, wherein, the number of the first reconfigurable reflective units is different from a number of the at least one first P-I-N diode, and the first reconfigurable reflective units are arranged into a one-dimensional array or a two-dimensional array; and the number of the second reconfigurable reflective units is different from a number of the at least one second P-I-N diode, and the second reconfigurable reflective units are arranged into another one-dimensional array or another two-dimensional array.

7. The system having the RRA structure of claim 6, wherein, the number of the first reconfigurable reflective units is greater than the number of the at least one first P-I-N diode, the number of the first reconfigurable reflective units is greater than the number of the at least one first switch element, and the number of the at least one first P-I-N diode, the number of the at least one first switch element and a number of the at least one first control unit are the same; and the number of the second reconfigurable reflective units is greater than the number of the at least one second P-I-N diode, the number of the second reconfigurable reflective units is greater than the number of the at least one second switch element, and the number of the at least one second P-I-N diode and the number of the at least one second switch element are the same.

8. The system having the RRA structure of claim 6, wherein, the first reconfigurable reflective units comprise:

a first radiating portion connected to the at least one first switch element;

a second radiating portion connected between the first radiating portion and the at least one first P-I-N diode; and a third radiating portion connected to the second radiating portion; and the second reconfigurable reflective units comprise:

a fourth radiating portion connected to the at least one second switch element; and a fifth radiating portion corresponding to the another part of the second reconfigurable reflective units.

9. The system having the RRA structure of claim 8, wherein, the at least one first control unit generates at least one first control signal, and the at least one first switch element receives the at least one first control signal and controls the first reconfigurable reflective units according to the at least one first control signal; and the at least one second control unit generates at least one second control signal, and the at least one second switch element receives the at least one second control signal and controls the fourth radiating portion according to the at least one second control signal.

10. A system having a Reconfigurable ReflectArray (RRA) structure, comprising:

a radiation layer, comprising:

at least one first P-Intrinsic-N (P-I-N) diode;

a plurality of second P-I-N diodes;

a plurality of first reconfigurable reflective units, wherein at least one part of the first reconfigurable reflective units is electrically connected to the at least one first P-I-N diode; and a plurality of second reconfigurable reflective units electrically connected to the second P-I-N diodes, respectively; and a control layer, comprising:

at least one first switch element electrically connected to the radiation layer;

at least one second switch element electrically connected to the radiation layer;

at least one first control unit electrically connected to the at least one first switch element; and at least one second control unit electrically connected to the at least one second switch element;

wherein a number of the first reconfigurable reflective units is different from a number of the at least one first switch element, and a number of the second reconfigurable reflective units is different from a number of the at least one second switch element.

11. The system having the RRA structure of claim 10, wherein, the number of the first reconfigurable reflective units is different from a number of the at least one first P-I-N diode, and the first reconfigurable reflective units are arranged into a one-dimensional array or a two-dimensional array; and the number of the second reconfigurable reflective units is the same as a number of the second P-I-N diodes, and the second reconfigurable reflective units are arranged into another one-dimensional array or another two-dimensional array.

12. The system having the RRA structure of claim 11, wherein, the number of the first reconfigurable reflective units is greater than the number of the at least one first P-I-N diode, the number of the first reconfigurable reflective units is greater than the number of the at least one first switch element, and the number of the at least one first P-I-N diode, the number of the at least one first switch element and a number of the at least one first control unit are the same; and the number of the second reconfigurable reflective units is greater than the number of the at least one second switch element, and the number of the second P-I-N diodes is greater than the number of the at least one second switch element.

13. The system having the RRA structure of claim 11, wherein, the first reconfigurable reflective units comprise:

a first radiating portion connected to the at least one first switch element;

a second radiating portion connected between the first radiating portion and the at least one first P-I-N diode; and a third radiating portion connected to the second radiating portion; and the second reconfigurable reflective units are connected to the at least one second switch element.

14. The system having the RRA structure of claim 13, wherein, the at least one first control unit generates at least one first control signal, and the at least one first switch element receives the at least one first control signal and controls the first reconfigurable reflective units according to the at least one first control signal; and the at least one second control unit generates at least one second control signal, and the at least one second switch element receives the at least one second control signal and controls the second reconfigurable reflective units according to the at least one second control signal.

15. The system having the RRA structure of claim 14, further comprising:

a display layer, comprising:

at least one first display element electrically connected to the at least one first switch element and the at least one first control unit of the control layer, wherein the at least one first display element receives the at least one first control signal and is controlled by the at least one first control signal; and at least one second display element electrically connected to the at least one second switch element and the at least one second control unit of the control layer, wherein the at least one second display element receives the at least one second control signal and is controlled by the at least one second control signal.

* * * * *